United States Patent
Eyman et al.

(10) Patent No.: US 11,059,510 B2
(45) Date of Patent: Jul. 13, 2021

(54) STROLLERS WITH REMOVABLE SEATS AND RELATED METHODS

(71) Applicant: Kolcraft Enterprises, Inc., Chicago, IL (US)

(72) Inventors: Mark Eyman, Chicago, IL (US); Peter Rolicki, Wheeling, IL (US); Wes Thomas, Racine, WI (US); Kenneth J. Bargo, Chicago, IL (US)

(73) Assignee: KOLCRAFT ENTERPRISES, INC., Chicago, IL (US)

( * ) Notice: Subject to any disclaimer, the term of this patent is extended or adjusted under 35 U.S.C. 154(b) by 63 days.

(21) Appl. No.: 16/320,914

(22) PCT Filed: Jul. 27, 2017

(86) PCT No.: PCT/US2017/044190
§ 371 (c)(1),
(2) Date: Jan. 25, 2019

(87) PCT Pub. No.: WO2018/022893
PCT Pub. Date: Feb. 1, 2018

(65) Prior Publication Data
US 2019/0256122 A1    Aug. 22, 2019

Related U.S. Application Data

(60) Provisional application No. 62/367,421, filed on Jul. 27, 2016.

(51) Int. Cl.
*B62B 7/14* (2006.01)
*B62B 7/08* (2006.01)
(Continued)

(52) U.S. Cl.
CPC ............... *B62B 7/08* (2013.01); *B62B 7/008* (2013.01); *B62B 7/142* (2013.01); *B62B 9/00* (2013.01);
(Continued)

(58) Field of Classification Search
CPC .............................. B62B 7/142; B62B 7/145
(Continued)

(56) References Cited

U.S. PATENT DOCUMENTS 2,907,372 A   10/1959  Leger
3,084,949 A    4/1963  Forster et al.
(Continued)

FOREIGN PATENT DOCUMENTS

BE    1014755    3/2004
CN    2853548    1/2007
(Continued)

OTHER PUBLICATIONS

International Searching Authority, "International Search Report," issued in connection with International Application No. PCT/US2017/044190, dated Sep. 27, 2017, 3 pages.
(Continued)

*Primary Examiner* — Jeffrey J Restifo
(74) *Attorney, Agent, or Firm* — Hanley, Flight & Zimmerman, LLC

(57) ABSTRACT

Strollers with removable seats and related methods are disclosed herein. An example stroller includes a wheeled frame, a receiver coupled to the frame, and a seat. The seat includes a hub, a mount, and a lock disposed in the mount. The lock is to move from a first positon to a second position when the mount is disposed in the receiver to removably couple the seat to the frame. The seat includes a handle and a pin disposed between the handle and the hub. The handle is moveable from a retracted position to an extended posi-
(Continued)

tion when the pin is in a third position relative to the handle and the lock is to move from the second position to the first position when the handle moves from the retracted position to the extended position.

19 Claims, 11 Drawing Sheets

(51) Int. Cl.
- *B62B 7/00* (2006.01)
- *B62B 9/00* (2006.01)
- *B62B 9/10* (2006.01)
- *B62B 9/12* (2006.01)
- *B62B 9/20* (2006.01)
- *B62B 9/28* (2006.01)

(52) U.S. Cl.
CPC .............. *B62B 9/102* (2013.01); *B62B 9/104* (2013.01); *B62B 9/12* (2013.01); *B62B 9/20* (2013.01); *B62B 9/28* (2013.01)

(58) Field of Classification Search
USPC .................................. 280/47.38, 47.39, 643
See application file for complete search history.

(56) References Cited

U.S. PATENT DOCUMENTS

| | | | |
|---|---|---|---|
| 4,142,027 A | 2/1979 | Tsygankov et al. | |
| 4,191,397 A | 3/1980 | Kassai | |
| 4,354,689 A | 10/1982 | Perego | |
| 4,786,064 A | 11/1988 | Baghdasarian | |
| 4,834,403 A | 5/1989 | Yanus et al. | |
| 4,953,880 A | 9/1990 | Sudakoff et al. | |
| 5,197,753 A | 3/1993 | Liu | |
| 5,201,535 A * | 4/1993 | Kato | B62B 7/123 280/30 |
| 5,203,577 A | 4/1993 | Kato et al. | |
| 5,215,320 A | 6/1993 | Chen | |
| 5,230,523 A | 7/1993 | Wilhelm | |
| 5,240,265 A | 8/1993 | Huang | |
| 5,265,931 A | 11/1993 | Ryan | |
| 5,364,137 A | 11/1994 | Shimer | |
| 5,499,831 A * | 3/1996 | Worth | B62B 7/08 280/30 |
| 5,516,142 A | 5/1996 | Hartan | |
| 5,517,718 A | 5/1996 | Eichhorn | |
| 5,562,300 A | 10/1996 | Nelson | |
| 5,596,910 A | 1/1997 | Bauer et al. | |
| 5,601,297 A | 2/1997 | Stein | |
| 5,625,923 A | 5/1997 | Huang | |
| 5,634,537 A | 6/1997 | Thorn | |
| 5,660,430 A | 8/1997 | Clarke | |
| 5,676,386 A * | 10/1997 | Huang | B62B 7/123 280/30 |
| 5,718,439 A | 2/1998 | Wang | |
| 5,765,665 A | 6/1998 | Cheng et al. | |
| 5,794,951 A * | 8/1998 | Corley | B62B 7/142 280/30 |
| 5,845,917 A | 12/1998 | Huang | |
| 5,845,924 A | 12/1998 | Huang | |
| 5,893,606 A * | 4/1999 | Chiang | A47D 1/004 280/30 |
| 5,935,010 A | 8/1999 | Clarke | |
| 5,975,545 A | 11/1999 | Hu | |
| 5,988,670 A | 11/1999 | Song et al. | |
| 6,022,042 A | 2/2000 | Hartenstine | |
| 6,045,145 A | 4/2000 | Lan | |
| 6,062,577 A | 5/2000 | Tan | |
| 6,070,890 A * | 6/2000 | Haut | B60N 2/2821 280/30 |
| 6,086,086 A | 7/2000 | Hanson et al. | |
| 6,086,087 A | 7/2000 | Yang | |
| 6,102,167 A | 8/2000 | Chiu | |
| 6,102,431 A | 8/2000 | Sutherland et al. | |
| 6,120,041 A | 9/2000 | Gehr, Jr. et al. | |
| 6,120,054 A | 9/2000 | Hu | |
| 6,155,592 A | 12/2000 | Hsia | |
| 6,163,924 A | 12/2000 | Ward, Jr. et al. | |
| 6,176,459 B1 | 1/2001 | Wilcox et al. | |
| 6,176,507 B1 | 1/2001 | Bigo et al. | |
| 6,193,263 B1 * | 2/2001 | Lin | B62B 7/145 280/30 |
| 6,238,125 B1 | 5/2001 | Lin | |
| 6,241,274 B1 | 6/2001 | Huang | |
| 6,250,652 B1 | 6/2001 | Nelson | |
| 6,264,007 B1 | 7/2001 | Norton et al. | |
| 6,270,111 B1 * | 8/2001 | Hanson | B62B 7/14 280/650 |
| 6,286,844 B1 * | 9/2001 | Cone, II | B62B 9/28 280/47.41 |
| 6,308,805 B1 | 10/2001 | Lan | |
| 6,318,807 B1 | 11/2001 | Perego | |
| 6,341,672 B1 | 1/2002 | Yang et al. | |
| 6,347,777 B1 | 2/2002 | Webber et al. | |
| 6,375,213 B1 | 4/2002 | Suzuki | |
| 6,375,260 B1 | 4/2002 | Hiramatsu et al. | |
| 6,398,233 B1 * | 6/2002 | Liang | B62B 7/06 280/30 |
| 6,402,114 B1 | 6/2002 | Carnahan et al. | |
| 6,412,809 B1 | 7/2002 | Bigo et al. | |
| 6,439,521 B1 | 8/2002 | Wilson et al. | |
| 6,443,468 B1 | 9/2002 | Eros | |
| 6,446,990 B1 * | 9/2002 | Nania | B62B 7/145 280/47.371 |
| 6,478,327 B1 | 11/2002 | Hartenstine et al. | |
| 6,478,328 B1 | 11/2002 | Yeh et al. | |
| 6,478,376 B2 | 11/2002 | Hayashi et al. | |
| 6,499,786 B2 | 12/2002 | Takahashi | |
| 6,502,669 B1 | 1/2003 | Harris | |
| 6,513,827 B1 * | 2/2003 | Barenbrug | B62B 7/145 280/648 |
| 6,554,298 B1 | 4/2003 | Bidwell | |
| 6,557,870 B2 | 5/2003 | Cheng | |
| 6,557,885 B1 | 5/2003 | Kakuda | |
| 6,572,134 B2 | 6/2003 | Barrett et al. | |
| 6,592,132 B2 | 7/2003 | Bidwell | |
| 6,595,583 B2 | 7/2003 | Hou | |
| 6,598,712 B1 | 7/2003 | Sun | |
| 6,626,452 B2 | 9/2003 | Yang et al. | |
| 6,666,473 B2 | 12/2003 | Hartenstine et al. | |
| 6,692,015 B2 | 2/2004 | Perego | |
| 6,715,783 B1 | 4/2004 | Hanson et al. | |
| 6,736,451 B1 | 5/2004 | Chen | |
| 6,742,791 B2 | 6/2004 | Lan | |
| 6,793,283 B1 | 9/2004 | Sipos | |
| 6,793,292 B2 | 9/2004 | Lan | |
| 6,830,260 B2 | 12/2004 | Everett | |
| 6,851,700 B2 | 2/2005 | Yoshie et al. | |
| 6,863,286 B2 * | 3/2005 | Eros | B62B 9/28 116/200 |
| 6,869,096 B2 | 3/2005 | Allen et al. | |
| 6,896,286 B2 | 5/2005 | Lin | |
| 6,908,087 B2 | 6/2005 | Wintersgill et al. | |
| 6,983,986 B2 | 1/2006 | Santamaria | |
| 6,991,248 B2 | 1/2006 | Valdez et al. | |
| 7,017,937 B2 | 3/2006 | Williams | |
| 7,032,922 B1 * | 4/2006 | Lan | B62B 7/08 280/643 |
| 7,044,497 B2 | 5/2006 | Hartenstine et al. | |
| 7,059,452 B2 | 6/2006 | Chen | |
| 7,070,197 B2 * | 7/2006 | Chen | B62B 7/123 280/642 |
| 7,083,175 B1 | 8/2006 | Liu | |
| 7,118,121 B2 | 10/2006 | Cheng et al. | |
| 7,188,858 B2 | 3/2007 | Hartenstine et al. | |
| 7,210,699 B2 | 5/2007 | Lan | |
| 7,213,818 B2 | 5/2007 | Chang | |
| 7,232,019 B2 | 6/2007 | Chang et al. | |
| 7,267,359 B1 * | 9/2007 | Yang | B62B 7/08 280/47.34 |

(56) References Cited

U.S. PATENT DOCUMENTS

| | | | |
|---|---|---|---|
| 7,278,652 B2 | 10/2007 | Riedl et al. | |
| 7,281,732 B2 | 10/2007 | Fox et al. | |
| 7,338,122 B2 | 3/2008 | Hei et al. | |
| 7,367,581 B2 | 5/2008 | Yang | |
| 7,370,913 B2 | 5/2008 | Takamizu et al. | |
| 7,377,537 B2 | 5/2008 | Li | |
| 7,383,925 B2 | 6/2008 | Chen | |
| 7,396,039 B2 | 7/2008 | Valdez et al. | |
| 7,401,803 B1* | 7/2008 | Lai | B62B 7/08 280/47.38 |
| 7,404,569 B2 | 7/2008 | Hartenstine et al. | |
| 7,410,186 B2 | 8/2008 | Hartenstine et al. | |
| D576,084 S | 9/2008 | Dotsey et al. | |
| 7,445,228 B2 | 11/2008 | Henry | |
| 7,455,336 B2 | 11/2008 | Bäumchen et al. | |
| 7,475,900 B2* | 1/2009 | Cheng | B62B 7/08 280/47.38 |
| 7,497,449 B2 | 3/2009 | Logger | |
| 7,497,461 B2 | 3/2009 | Emerson | |
| 7,500,692 B2 | 3/2009 | Espenshade | |
| 7,537,093 B2 | 5/2009 | Chen | |
| 7,550,692 B2 | 6/2009 | Bong | |
| 7,566,068 B2 | 7/2009 | Santamaria | |
| 7,597,396 B2 | 10/2009 | Longenecker et al. | |
| 7,600,775 B2 | 10/2009 | Chen et al. | |
| 7,614,641 B2 | 11/2009 | Hartenstine et al. | |
| 7,618,093 B2 | 11/2009 | Hung-Chung | |
| 7,632,035 B2 | 12/2009 | Cheng | |
| 7,658,399 B2 | 2/2010 | Van Dijk | |
| 7,677,590 B2 | 3/2010 | Dotsey et al. | |
| 7,681,894 B2* | 3/2010 | Santamaria | B62B 7/142 280/47.38 |
| 7,686,322 B2 | 3/2010 | Longenecker et al. | |
| 7,686,323 B2* | 3/2010 | Chen | B62B 7/147 280/642 |
| 7,694,980 B2 | 4/2010 | Dotsey et al. | |
| 7,694,995 B2 | 4/2010 | Dotsey et al. | |
| 7,712,765 B2 | 5/2010 | Chen et al. | |
| 7,753,398 B2 | 7/2010 | Yang | |
| 7,766,366 B2 | 8/2010 | Li | |
| 7,766,367 B2 | 8/2010 | Dotsey et al. | |
| 7,780,183 B2 | 8/2010 | Chen et al. | |
| 7,784,801 B2 | 8/2010 | Yeh | |
| 7,798,500 B2* | 9/2010 | Den Boer | B62B 7/142 280/47.34 |
| 7,798,515 B2 | 9/2010 | Valdez et al. | |
| 7,832,755 B2 | 11/2010 | Nolan et al. | |
| 7,871,099 B2 | 1/2011 | Gilbertson et al. | |
| 7,871,100 B2 | 1/2011 | Chen et al. | |
| 7,900,952 B2 | 3/2011 | Cone, II | |
| 7,909,353 B2 | 3/2011 | Nolan et al. | |
| 7,918,001 B2 | 4/2011 | Buckingham | |
| 7,922,182 B2 | 4/2011 | Van der Vegt | |
| 7,946,650 B2 | 5/2011 | Gillet | |
| 7,971,884 B2 | 7/2011 | Lundh | |
| 7,971,897 B2 | 7/2011 | Pike et al. | |
| 7,971,933 B2 | 7/2011 | Tuckey et al. | |
| D643,344 S | 8/2011 | Barenbrug | |
| D643,345 S | 8/2011 | Barenbrug | |
| D643,346 S | 8/2011 | Barenbrug | |
| D643,786 S | 8/2011 | Barenbrug | |
| 8,033,555 B2 | 10/2011 | Mostert et al. | |
| 8,056,975 B2 | 11/2011 | Longenecker et al. | |
| 8,061,732 B2 | 11/2011 | Song et al. | |
| 8,087,680 B2 | 1/2012 | Dotsey et al. | |
| 8,087,688 B2 | 1/2012 | Gilbertson et al. | |
| 8,092,111 B2 | 1/2012 | Wu | |
| 8,100,429 B2 | 1/2012 | Longenecker et al. | |
| 8,157,273 B2 | 4/2012 | Bar-Lev | |
| 8,162,025 B2 | 4/2012 | Motosko et al. | |
| 8,172,243 B2 | 5/2012 | Dresher | |
| 8,172,253 B2 | 5/2012 | Song | |
| 8,186,705 B2 | 5/2012 | Greger et al. | |
| 8,205,906 B2 | 6/2012 | Kretschmer et al. | |
| 8,205,907 B2 | 6/2012 | Chicca | |
| 8,220,118 B2 | 7/2012 | Buckingham et al. | |
| 8,226,110 B2 | 7/2012 | Liao | |
| 8,226,111 B2 | 7/2012 | Valdez et al. | |
| 8,231,136 B2 | 7/2012 | Fiore, Jr. | |
| 8,240,700 B2 | 8/2012 | Greger et al. | |
| 8,251,382 B2* | 8/2012 | Chen | B62B 9/102 280/47.41 |
| 8,262,103 B2 | 9/2012 | Enserink et al. | |
| 8,276,935 B2 | 10/2012 | Minato et al. | |
| 8,282,120 B2 | 10/2012 | Minato et al. | |
| 8,291,555 B2 | 10/2012 | Buckingham et al. | |
| 8,313,115 B2 | 11/2012 | Cheng | |
| 8,316,999 B2 | 11/2012 | Solinski et al. | |
| 8,322,744 B2 | 12/2012 | Ahnert et al. | |
| 8,366,127 B2 | 2/2013 | Zhong et al. | |
| 8,371,606 B2 | 2/2013 | Gower et al. | |
| 8,376,375 B2* | 2/2013 | Mival | B62B 7/08 280/47.38 |
| 8,382,127 B2* | 2/2013 | Longenecker | B62B 7/145 280/47.4 |
| 8,382,150 B2 | 2/2013 | Williams et al. | |
| 8,388,254 B2 | 3/2013 | Huang | |
| 8,393,679 B2 | 3/2013 | Longenecker et al. | |
| 8,398,096 B2 | 3/2013 | Gower et al. | |
| 8,398,111 B2 | 3/2013 | Mival et al. | |
| 8,398,143 B1 | 3/2013 | Haley | |
| 8,414,012 B2* | 4/2013 | Chen | B62B 7/145 280/648 |
| 8,418,816 B2 | 4/2013 | Chen | |
| 8,444,170 B2 | 5/2013 | Chen et al. | |
| 8,448,977 B2 | 5/2013 | Grintz et al. | |
| D683,974 S | 6/2013 | Leys et al. | |
| 8,458,880 B2 | 6/2013 | Fiore, Jr. | |
| 8,459,665 B2 | 6/2013 | Sellers et al. | |
| 8,474,836 B2 | 7/2013 | Yang et al. | |
| 8,474,854 B2 | 7/2013 | Dean et al. | |
| 8,485,546 B2 | 7/2013 | Li et al. | |
| 8,490,757 B2 | 7/2013 | Chen et al. | |
| 8,491,000 B2 | 7/2013 | Yeh et al. | |
| 8,505,956 B2 | 8/2013 | Hartenstine et al. | |
| 8,517,412 B2 | 8/2013 | Tsai et al. | |
| 8,550,489 B2 | 10/2013 | Valdez et al. | |
| 8,556,780 B2 | 10/2013 | Chen | |
| 8,567,311 B2 | 10/2013 | Kraus | |
| 8,567,866 B2 | 10/2013 | Di Carimate et al. | |
| 8,585,063 B2 | 11/2013 | Chen | |
| 8,585,075 B2* | 11/2013 | Zhong | B62B 7/142 280/648 |
| 8,590,919 B2 | 11/2013 | Yi | |
| 8,596,669 B2 | 12/2013 | Liao | |
| 8,596,670 B2 | 12/2013 | di Carimate et al. | |
| 8,602,442 B2 | 12/2013 | Li | |
| 8,608,190 B2 | 12/2013 | Mountz | |
| 8,616,638 B2 | 12/2013 | Zeng et al. | |
| 8,635,743 B2 | 1/2014 | Smith et al. | |
| D699,633 S | 2/2014 | Kobayashi et al. | |
| 8,646,158 B2 | 2/2014 | Buckingham et al. | |
| 8,651,502 B2* | 2/2014 | Winterhalter | B60N 2/2848 280/47.4 |
| 8,657,308 B2 | 2/2014 | Gower et al. | |
| 8,657,311 B2 | 2/2014 | Li | |
| 8,662,516 B1 | 3/2014 | Slagerman | |
| 8,672,341 B2* | 3/2014 | Offord | B62B 7/008 280/650 |
| 8,678,498 B2 | 3/2014 | Heisey | |
| 8,696,015 B2 | 4/2014 | Karremans et al. | |
| 8,702,118 B2 | 4/2014 | Gower et al. | |
| 8,708,364 B2 | 4/2014 | Gower et al. | |
| 8,713,765 B2 | 5/2014 | Buckingham et al. | |
| 8,714,581 B2* | 5/2014 | Fritz | B62B 9/245 280/642 |
| 8,720,936 B1 | 5/2014 | Lai | |
| 8,764,048 B1 | 7/2014 | Ahnert et al. | |
| 8,777,253 B2 | 7/2014 | Minato et al. | |
| 8,789,662 B2 | 7/2014 | Childs et al. | |
| 8,827,283 B2 | 9/2014 | Homan et al. | |
| 8,840,132 B2 | 9/2014 | Gower et al. | |

(56) References Cited

U.S. PATENT DOCUMENTS

| | | |
|---|---|---|
| 8,844,964 B2 | 9/2014 | Chiang |
| 8,851,505 B2 * | 10/2014 | Van Gelderen ............ B62B 7/14 |
| | | 280/658 |
| 8,864,166 B2 | 10/2014 | Longenecker et al. |
| D716,705 S | 11/2014 | Holefleisch |
| 8,876,147 B2 | 11/2014 | Chicca |
| 8,882,134 B2 | 11/2014 | Rolicki et al. |
| 8,899,614 B2 | 12/2014 | Smith |
| 8,899,615 B2 | 12/2014 | Dijkstra |
| 8,905,427 B2 | 12/2014 | Katz et al. |
| 8,905,428 B2 | 12/2014 | Schroeder et al. |
| 8,919,806 B2 | 12/2014 | Pollack et al. |
| 8,919,807 B2 | 12/2014 | Taylor et al. |
| 8,936,261 B2 | 1/2015 | Yuan |
| 8,955,856 B2 * | 2/2015 | Guo ........................ B62B 7/145 |
| | | 280/47.38 |
| 8,955,868 B2 | 2/2015 | Haut et al. |
| 8,955,869 B2 | 2/2015 | Zehfuss |
| 8,960,734 B2 | 2/2015 | Camp |
| 8,961,057 B2 | 2/2015 | Schroeder |
| 8,973,217 B2 | 3/2015 | Weichbrodt |
| 8,985,616 B1 | 3/2015 | Chen |
| 8,991,838 B2 | 3/2015 | Li et al. |
| 8,991,853 B2 | 3/2015 | Li et al. |
| 8,991,854 B2 | 3/2015 | Greger et al. |
| 8,997,948 B2 | 4/2015 | Li et al. |
| 9,010,773 B2 * | 4/2015 | Horst ...................... B62B 7/145 |
| | | 280/47.38 |
| 9,044,104 B2 | 6/2015 | Smith |
| 9,050,993 B2 | 6/2015 | Pollack |
| 9,067,613 B2 | 6/2015 | Yi et al. |
| 9,085,312 B2 * | 7/2015 | Liu ......................... B62B 7/145 |
| 9,090,125 B2 | 7/2015 | Block et al. |
| 9,108,658 B2 | 8/2015 | Spencer et al. |
| 9,108,659 B2 | 8/2015 | Sparling |
| 9,139,044 B1 | 9/2015 | Tsai |
| 9,150,236 B2 | 10/2015 | Zhang |
| 9,174,662 B2 | 11/2015 | Zhang |
| 9,193,370 B2 | 11/2015 | Henry |
| 9,193,373 B2 | 11/2015 | Fjelland et al. |
| 9,205,855 B2 | 12/2015 | Gower et al. |
| 9,216,755 B2 | 12/2015 | Eisinger |
| 9,260,127 B2 | 2/2016 | Rolicki et al. |
| 9,260,128 B2 * | 2/2016 | Liu ......................... B62B 7/142 |
| D756,852 S | 5/2016 | Barenbrug |
| 9,327,752 B2 | 5/2016 | Santamaria |
| 9,399,477 B2 | 7/2016 | Iftinca et al. |
| 9,403,449 B2 | 8/2016 | Longenecker et al. |
| 9,403,549 B2 | 8/2016 | Driessen |
| 9,403,550 B2 | 8/2016 | Zehfuss |
| 9,415,790 B2 | 8/2016 | Driessen |
| 9,428,208 B1 | 8/2016 | Chen |
| 9,463,822 B2 | 10/2016 | Sundberg et al. |
| 9,481,206 B2 | 11/2016 | Block et al. |
| 9,493,178 B2 | 11/2016 | Smith et al. |
| 9,517,786 B2 * | 12/2016 | Chang .................... B62B 7/145 |
| 9,517,789 B2 * | 12/2016 | Pacella .................. B62B 7/142 |
| 9,522,615 B2 | 12/2016 | Longenecker et al. |
| 9,540,028 B2 | 1/2017 | Taylor et al. |
| 9,545,940 B2 * | 1/2017 | Taylor .................... B62B 7/142 |
| 9,545,941 B2 | 1/2017 | Pacella et al. |
| 9,561,816 B2 | 2/2017 | Dowd et al. |
| 9,610,966 B2 | 4/2017 | Zhong |
| 9,630,642 B2 | 4/2017 | Zehfuss et al. |
| 9,637,153 B2 | 5/2017 | Sclare |
| 9,643,640 B2 | 5/2017 | Gower et al. |
| 9,701,332 B2 | 7/2017 | Zheng |
| 9,725,107 B2 | 8/2017 | Li |
| 9,776,652 B2 | 10/2017 | Zhong |
| 9,796,404 B2 | 10/2017 | Xu |
| 9,815,487 B2 | 11/2017 | Dowd et al. |
| 9,821,831 B2 | 11/2017 | Reaves et al. |
| 9,840,168 B2 | 12/2017 | Yi et al. |
| 9,849,903 B1 | 12/2017 | Lai |
| 9,862,401 B2 | 1/2018 | Wuerstl |
| 9,884,640 B2 * | 2/2018 | Li ........................... B62B 7/142 |
| 9,902,417 B2 | 2/2018 | Storm et al. |
| 9,908,551 B2 | 3/2018 | Ransil |
| 9,944,305 B2 | 4/2018 | Lee et al. |
| 9,950,730 B2 | 4/2018 | Gao |
| 9,962,011 B1 | 5/2018 | Eyman |
| 10,000,226 B2 | 6/2018 | Yi |
| 10,023,218 B2 * | 7/2018 | Paxton ................. A47D 13/025 |
| 10,077,063 B2 * | 9/2018 | Haut ......................... B62B 9/28 |
| 10,144,442 B2 | 12/2018 | Ransil |
| 10,150,496 B2 | 12/2018 | Oakes |
| 10,155,528 B2 | 12/2018 | Zhong et al. |
| 10,239,550 B2 * | 3/2019 | Ruggiero ................ B62B 9/245 |
| 10,414,423 B2 * | 9/2019 | Zhong ...................... B62B 7/08 |
| 10,442,453 B2 * | 10/2019 | Haut ....................... B62B 7/062 |
| 10,449,987 B2 * | 10/2019 | Gibson .................. B62B 7/008 |
| 10,556,610 B2 | 2/2020 | Rolicki et al. |
| 2002/0041082 A1 | 4/2002 | Perego |
| 2003/0094791 A1 | 5/2003 | Hartenstine et al. |
| 2004/0090046 A1 | 5/2004 | Hartenstine et al. |
| 2005/0150053 A1 | 7/2005 | Hartenstine |
| 2005/0167951 A1 | 8/2005 | Zhen |
| 2005/0225056 A1 | 10/2005 | Dotsey et al. |
| 2005/0242548 A1 | 11/2005 | Hutchinson et al. |
| 2005/0264064 A1 | 12/2005 | Hei et al. |
| 2007/0013167 A1 | 1/2007 | Henry |
| 2007/0031224 A1 | 2/2007 | Lutz |
| 2007/0045975 A1 * | 3/2007 | Yang ........................ B62B 7/14 |
| | | 280/47.38 |
| 2007/0085303 A1 | 4/2007 | Cheng |
| 2007/0108710 A1 | 5/2007 | Pennisi et al. |
| 2007/0126195 A1 | 6/2007 | Dresher |
| 2007/0187914 A1 | 8/2007 | Santamaria |
| 2007/0241524 A1 | 10/2007 | Dotsey et al. |
| 2008/0079240 A1 | 4/2008 | Yeh |
| 2008/0093825 A1 | 4/2008 | Yang |
| 2008/0211206 A1 | 9/2008 | Thorne et al. |
| 2008/0224450 A1 * | 9/2008 | Van der Vegt ............ B62B 9/14 |
| | | 280/642 |
| 2008/0231023 A1 * | 9/2008 | Yang ....................... B62B 7/142 |
| | | 280/650 |
| 2009/0194973 A1 | 8/2009 | Wang |
| 2009/0206566 A1 | 8/2009 | Enserink et al. |
| 2009/0295128 A1 | 12/2009 | Nagelski et al. |
| 2009/0315299 A1 | 12/2009 | Barenbrug |
| 2010/0038887 A1 | 2/2010 | Bar-Lev |
| 2010/0052277 A1 | 3/2010 | Zehfuss |
| 2010/0109293 A1 | 5/2010 | Friisdahl et al. |
| 2010/0127480 A1 | 5/2010 | Ahnert et al. |
| 2010/0140902 A1 | 6/2010 | Zehfuss |
| 2010/0230933 A1 | 9/2010 | Dean et al. |
| 2010/0237637 A1 | 9/2010 | Camp |
| 2011/0012324 A1 | 1/2011 | Yeh et al. |
| 2011/0062676 A1 | 3/2011 | Gower et al. |
| 2011/0148076 A1 | 6/2011 | Chen |
| 2011/0181024 A1 | 6/2011 | Chicca |
| 2011/0163519 A1 | 7/2011 | Van Gelderen et al. |
| 2011/0193325 A1 * | 8/2011 | Li ........................... B62B 9/203 |
| | | 280/650 |
| 2011/0221169 A1 | 9/2011 | Karremans et al. |
| 2011/0266762 A1 * | 11/2011 | Chen ....................... B62B 9/104 |
| | | 280/47.38 |
| 2011/0272925 A1 | 11/2011 | Dijkstra |
| 2011/0291388 A1 | 12/2011 | Sellers et al. |
| 2011/0291389 A1 | 12/2011 | Offord |
| 2011/0309658 A1 | 12/2011 | Di Carimate et al. |
| 2012/0242062 A1 | 9/2012 | Schroeder et al. |
| 2013/0113185 A1 | 5/2013 | Zehfuss |
| 2013/0153616 A1 | 6/2013 | Geva et al. |
| 2013/0154215 A1 | 6/2013 | Thomas et al. |
| 2013/0154322 A1 | 6/2013 | Gower et al. |
| 2013/0227817 A1 | 9/2013 | Block et al. |
| 2013/0270800 A1 | 10/2013 | Chiang |
| 2014/0044472 A1 | 2/2014 | Lin et al. |
| 2014/0054939 A1 | 2/2014 | Hu |
| 2014/0056638 A1 | 2/2014 | Wu et al. |
| 2014/0167393 A1 | 6/2014 | Tsai et al. |
| 2014/0183843 A1 | 7/2014 | Iftinca et al. |
| 2014/0191483 A1 | 7/2014 | Rolicki et al. |

(56) References Cited

U.S. PATENT DOCUMENTS

| | | | |
|---|---|---|---|
| 2015/0021872 A1 | 1/2015 | Rolicki et al. | |
| 2015/0042075 A1 | 2/2015 | Smith et al. | |
| 2015/0074947 A1 | 3/2015 | Rezaei | |
| 2015/0076774 A1 | 3/2015 | Sclare | |
| 2015/0108738 A1 | 4/2015 | Pollack et al. | |
| 2015/0136553 A1 | 5/2015 | Den Boer et al. | |
| 2015/0152665 A1 | 6/2015 | Camp | |
| 2015/0158334 A1 | 6/2015 | Hartenstine et al. | |
| 2015/0197268 A1 | 7/2015 | Dowd et al. | |
| 2015/0274188 A1 | 10/2015 | Li | |
| 2015/0291200 A1 | 10/2015 | Taylor et al. | |
| 2015/0375766 A1* | 12/2015 | Taylor | B62B 7/142 |
| | | | 280/647 |
| 2016/0001804 A1 | 1/2016 | Pacella et al. | |
| 2016/0046314 A1 | 2/2016 | Zehfuss et al. | |
| 2016/0159385 A1 | 6/2016 | Rolicki et al. | |
| 2016/0288814 A1 | 10/2016 | Li | |
| 2016/0332655 A1 | 11/2016 | Reaves et al. | |
| 2017/0021851 A1 | 1/2017 | Pujol | |
| 2017/0144686 A1 | 5/2017 | Pujol et al. | |
| 2017/0203779 A1 | 7/2017 | Gower et al. | |
| 2017/0217471 A1 | 8/2017 | Haut et al. | |
| 2017/0240197 A1 | 8/2017 | Oakes | |
| 2017/0297600 A1 | 10/2017 | Zhong et al. | |
| 2017/0313337 A1 | 11/2017 | Horst | |
| 2018/0001950 A1 | 1/2018 | Allen | |
| 2018/0029625 A1 | 2/2018 | Ruggiero et al. | |
| 2018/0111636 A1 | 4/2018 | Gower et al. | |
| 2019/0009811 A1 | 1/2019 | Haut et al. | |
| 2019/0168794 A1 | 6/2019 | Eyman et al. | |
| 2019/0193769 A1 | 6/2019 | Xu et al. | |
| 2019/0256121 A1 | 8/2019 | Rolicki et al. | |

FOREIGN PATENT DOCUMENTS

| | | |
|---|---|---|
| CN | 201161604 | 12/2008 |
| CN | 201530404 | 7/2010 |
| CN | 101837799 | 9/2010 |
| CN | 201792891 | 4/2011 |
| CN | 104354750 | 2/2015 |
| CN | 205022654 | 2/2016 |
| CN | 205186242 | 4/2016 |
| CN | 205345000 | 6/2016 |
| DE | 3130163 | 2/1983 |
| DE | 10011588 | 1/2001 |
| DE | 202007011019 | 12/2007 |
| DE | 202010011566 | 11/2010 |
| EP | 791500 | 8/1997 |
| EP | 1918155 | 5/2008 |
| EP | 1992543 | 11/2008 |
| EP | 2192022 | 6/2010 |
| EP | 2275321 | 1/2011 |
| EP | 2368784 | 9/2011 |
| EP | 2420429 | 2/2012 |
| EP | 2892790 | 7/2015 |
| EP | 2927090 | 10/2015 |
| FR | 2648102 | 12/1990 |
| GB | 2171299 | 8/1986 |
| GB | 2193692 | 2/1988 |
| GB | 2431140 | 4/2007 |
| JP | 2008030741 | 2/2008 |
| WO | 2008033014 | 3/2008 |
| WO | 2010047596 | 4/2010 |
| WO | 2014037177 | 3/2014 |
| WO | 2015109103 | 7/2015 |
| WO | 2018022889 | 2/2018 |
| WO | 2018022893 | 2/2018 |
| WO | 2018022895 | 2/2018 |
| WO | 2019019097 | 1/2019 |

OTHER PUBLICATIONS

International Searching Authority, "Written Opinion of the International Searching Authority," issued in connection with International Application No. PCT/US2017/044190, dated Sep. 27, 2017, 7 pages.

United States Patent and Trademark Office, "Notice of Allowance," issued in connection with U.S. Appl. No. 16/320,913, dated Dec. 30, 2020, 5 pages.

Chinese Patent Office, "Office Action," issued in connection with Chinese Patent Application No. 201780056235.4, dated Dec. 30, 2020, 23 pages (includes English translation).

United States Patent and Trademark Office, "Notice of Allowance," issued in connection with U.S. Appl. No. 16/320,910, dated Nov. 25, 2020, 8 pages.

United States Patent and Trademark Office, "Notice of Allowance," issued in connection with U.S. Appl. No. 16/322,350, dated Feb. 11, 2021, 8 pages.

International Search Authority, "International Search Report," issued in connection with International Patent Application No. PCT/US2017/044192, dated Oct. 24, 2017, 3 pages.

International Search Authority, "Written Opinion of the International Searching Authority," issued in connection with International Patent Application No. PCT/US2017/044192, dated Oct. 24, 2017, 11 pages.

International Search Authority, "International Search Report," issued in connection with International Patent Application No. PCT/US2017/044183, dated Oct. 24, 2017, 3 pages.

International Search Authority, "Written Opinion of the International Searching Authority," issued in connection with International Patent Application No. PCT/US2017/044183, dated Oct. 24, 2017, 9 pages.

International Bureau of WIPO, "International Search Report and Written Opinion," issued in connection with International Patent Application No. PCT/CN2017/094679, dated Mar. 27, 2018, 10 pages.

International Bureau of WIPO, "International Preliminary Report on Patentability," dated Jan. 29, 2019 in connection with International Patent Application No. PCT/US2017/044190, 8 pages.

United Stapes Patent and Trademark Office, "Notice of Allowance," issued in connection with U.S. Appl. No. 16/322,350, dated Dec. 12, 2019, 8 pages.

The International Bureau of WIPO, "International Preliminary Report on Patentability," issued in connection with International Patent Application No. PCT/CN2017/094679, dated Jan. 28, 2020, 5 pages.

European Patent Office, "Extended European Search Report," issued in connection with European Patent Application No. 17835273.8, dated Mar. 13, 2020, 9 pages.

The International Bureau of WIPO, "International Preliminary Report on Patentability," issued in connection with International Patent Application No. PCT/US2017/044183, dated Jan. 29, 2019, 10 pages.

The International Bureau of WIPO, "International Preliminary Report on Patentability," issued in connection with Internatonal Patent Application No. PCT/US2017/044192, dated Jan. 29, 2019, 12 pages.

European Patent Office, "Extended European Search Report," issued in connection with European Patent Application No. 17835275.3, dated Mar. 13, 2020, 8 pages.

United Stapes Patent and Trademark Office, "Notice of Allowance," issued in connection with U.S. Appl. No. 16/322,350, dated Apr. 20, 2020, 8 pages.

European Patent Office, "Extended European Search Report," issued in connection with European Patent Application No. 17919214.1, dated Jun. 2, 2020, 8 pages.

United States Patent and Trademark Office, "Office Action," issued in connection with U.S. Appl. No. 16/320,910, dated Jun. 19, 2020, 14 pages.

United Stapes Patent and Trademark Office, "Notice of Allowance," issued in connection with U.S. Appl. No. 16/322,350, dated Aug. 25, 2020, 8 pages.

United Stapes Patent and Trademark Office, "Non-Final Office Action," issued in connection with U.S. Appl. No. 16/320,913, dated Sep. 4, 2020, 5 pages.

(56) References Cited

OTHER PUBLICATIONS

China National Intellectual Property Administration, "Office Action," issued in connection with Chinese Patent Application No. 201780056227, dated Nov. 4, 2020, 19 pages (includes English translation).

China National Intellectual Property Administration, "Office Action," issued in connection with Chinese Patent Application No. 201780056364, dated Nov. 17, 2020, 8 pages.

* cited by examiner

STROLLERS WITH REMOVABLE SEATS AND RELATED METHODS

RELATED APPLICATION

This patent claims priority to U.S. Provisional Patent Application Ser. No. 62/367,421, titled "Foldable Stroller with Removable Seats and Related Methods," which was filed on Jul. 27, 2016, and is hereby incorporated by reference in its entirety.

FIELD OF THE DISCLOSURE

This disclosure relates generally to strollers and, more particularly, to strollers with removable seats and related methods.

BACKGROUND

Known strollers include a frame to support one or more seats and/or accessories (e.g., a basket).

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
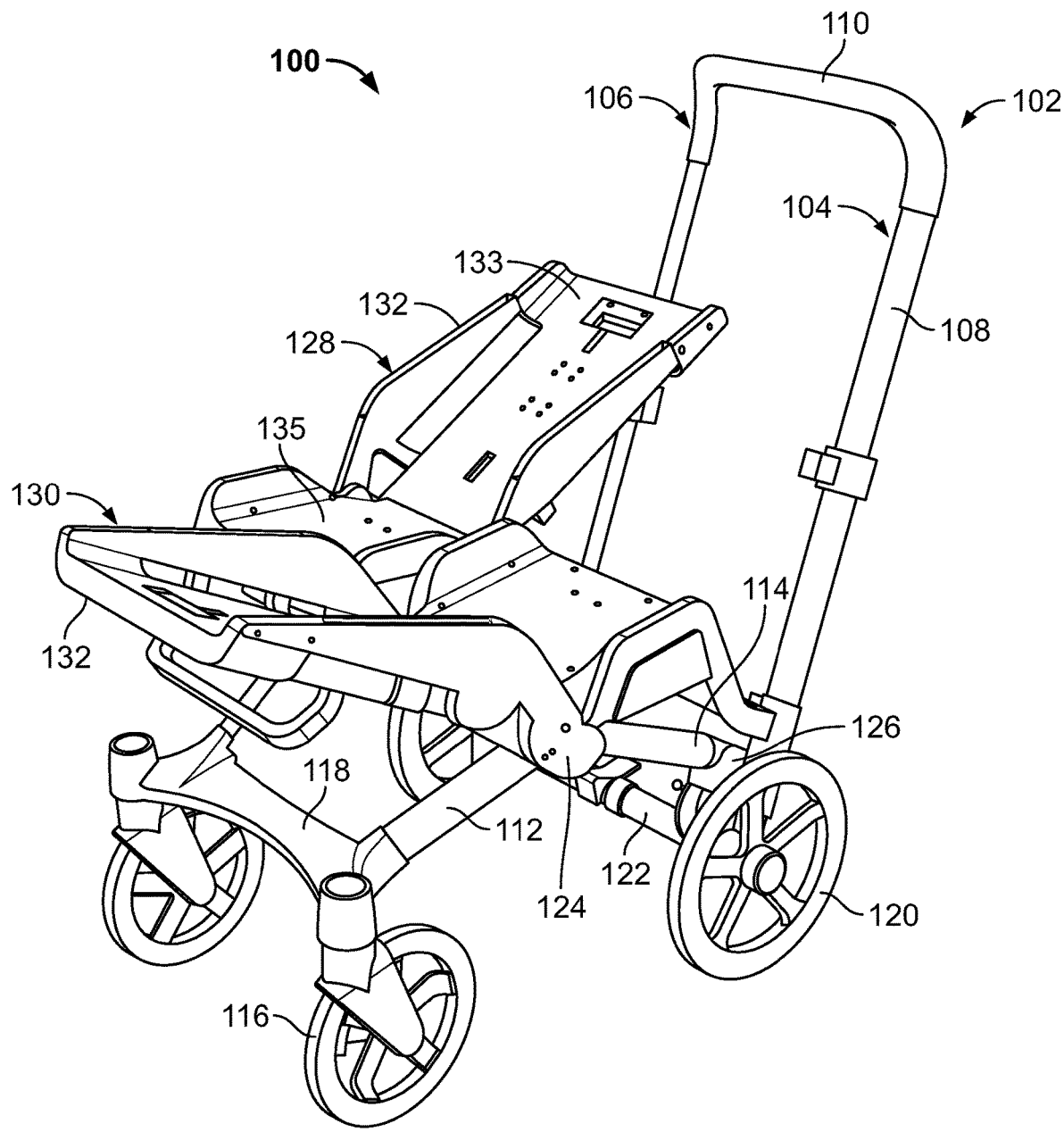
FIG. 1 is a right, front perspective view of an example stroller having two seats coupled to a frame of the stroller in accordance with the teachings of this disclosure.

Strollers typically include a frame and a seat supported by the frame to receive a child occupant. In some examples, an accessory, such as a basket, is also supported by the frame. However, some known strollers are limited with respect to a number of seats provided. For example, some strollers include only one seat for one child. If a user wishes to carry a second child in the stroller, the user has to purchase a different stroller that includes two seats (e.g., a double stroller). However, a double stroller having two identical seats may not be appropriate if, for example, one child is capable of sitting upright but the other child cannot sit upright because of the child's age. Also, a double stroller may be difficult to push if there is only one child in the stroller because of the extra unoccupied seat and/or uneven loading of the stroller. Thus, some known strollers do not provide for flexibility in accommodating different numbers of occupants and/or occupants of different ages.

To provide for flexibility in the number of occupants, some known strollers include an expandable stroller frame which allows a user to move the stroller frame from a first width to a second width greater than the first width. In the non-expanded position having the first width, the stroller may have one seat coupled to the stroller frame. In the expanded position having the second width, two seats may be coupled to the stroller frame. To return the stroller to the non-expanded position, the user compresses the frame. However, such strollers are difficult for the user to manipulate, as these strollers require the user to reconfigure the stroller frame, including expanding the stroller frame before attaching the second seat. If the stroller frame is not properly secured in the expanded position or the non-expanded position, the stability of the stroller frame and, thus, the support provided by the stroller frame for one or more occupants seated in the seat(s) attached to the stroller frame may be compromised.

Disclosed herein are example strollers for removably coupling one or more seats and/or accessories (e.g., baskets) to the stroller frame. In the disclosed examples, the one or more seats and/or accessories are removably coupled to the stroller frame without changing a size of the stroller frame. Rather, one seat, two seats, or one seat and an accessory can be selectively coupled to the stroller frame without any adjustments to the frame itself.

Example strollers frames disclosed herein selectively move between supporting one seat or accessory, one seat and an accessory, or two seats or accessories via a coupling mechanism between the stroller frame and the seat(s) and/or the accessory/accessories. Example stroller frames disclosed herein include a mount bar for supporting one or more seats and/or accessories coupled to the stroller frame. The mount bar includes a plurality of mount receivers. Each mount receiver receives a corresponding part of a seat or an accessory to removably secure the seat or the accessory to the stroller frame at one or more positions relative to the stroller frame (e.g., left, right, or middle).

In some disclosed examples, the seat or accessory includes a coupling mechanism that is controlled by a user (e.g., a child caretaker) to selectively lock or unlock the seat or the accessory to a mount receiver of the mount bar of the stroller frame. In some such examples, the mount bar of the stroller frame is a passive mechanical part that receives the coupling mechanism, thereby reducing the number of moving mechanical parts on the stroller frame. In some disclosed examples, the coupling mechanism between the stroller frame and the seat(s) and accessories are same or substantially the same for each seat or accessory to provide for easy installation and removal of the seat or accessory by the user.

Some example seats disclosed herein include a napper bar and backrest portion that can be selectively adjusted to release a lock that enables a handle of the seat to be pulled by the user. In such examples, the pulling of the handle releases a coupling between the seat and a mount receiver to which the seat mount is coupled and allows the seat to be removed from the mount receiver. Thus, example seats disclosed herein include multiple locking mechanisms to prevent instances of unintended disengagement between the seat and the stroller (e.g., by a child, by mechanical failure), which could result in injury to the child occupant. Example seats disclosed herein provide for ease of access for the user to removably attach the seat to the stroller frame while providing for a secure coupling between the stroller frame and the seat to protect the child occupant.

Further, a position of the one or more seats or accessories coupled to the example stroller frames can be varied with respect to (1) placement relative to a left side, a center, and/or a right side of the stroller and/or (2) orientation including forward- or rearward-facing or sideways relative to a direction of travel of the stroller. The placement and/or orientation of the one or more seats or accessories can be varied without modification to the stroller frame or the coupling mechanism between the seats or accessories and the stroller frame. Additionally, the disclosed example strollers can receive different types of seats, such as an upright seat, a car seat, and/or a bassinet. In some disclosed examples, an upright seat and a bassinet can each be coupled to the stroller frame to accommodate differently aged children. One of the seats can be removed from the frame to reduce the occupancy of the stroller. The stroller can be used as a single-seat stroller. In other examples, a basket accessory can be coupled to the stroller frame in place of the second seat to provide storage space. Also, in some examples, the seat(s) may be removed and only an accessory may be coupled to the frame such as, for example, one or more basket(s), and the frame may be used to transport items (e.g., groceries).

An example stroller includes a wheeled frame, a receiver coupled to the frame, and a seat. The seat includes a hub; a mount; a lock disposed in the mount, the lock to move from a first positon to a second position when the mount is disposed in the receiver to removably couple the seat to the frame; a handle; and a pin disposed between the handle and the hub. The handle is moveable from a retracted position to an extended position when the pin is in a third position relative to the handle and the lock to move from the second position to the first position when the handle moves from the retracted position to the extended position.

In some examples, the hub includes a cam. The cam is to cause the pin to selectively engage a pocket of the handle. In some such examples, in the third position, the pin is spaced apart from the pocket.

In some examples, the stroller further includes an actuator disposed in the mount. The actuator is to rotate to cause the lock to move to the second position when the handle moves to the extended position. In some such examples, the stroller further includes a plate slidably coupled to the handle. The actuator is to rotate via sliding of the plate.

In some examples, the stroller further includes a plate slidably coupled to the handle. The actuator is to rotate via sliding of the plate.

In some examples, in the second position, the lock is disposed in an opening of the receiver and in the first position, the lock is retracted relative to the opening.

In some examples, the receiver is a first receiver and the stroller further includes a second receiver coupled to the frame. The seat is to be removably coupled to the first receiver or the second receiver.

Another example stroller disclosed herein includes a wheeled frame; a mount bar coupled to the frame, the mount bar including a plurality of receivers; and a seat. The seat includes a hub, a mount, and a handle. The hub is to selectively enable the handle to move between an extended position and a retracted position to removably couple the mount to one of the plurality of receivers.

In some examples, the mount includes a lock and each of the receivers includes an opening. The handle is to cause the lock to move relative to the opening to removably couple the mount to the one of the plurality of receivers.

In some examples, each of the plurality of receivers includes a substantially frustoconical portion and the mount includes a substantially frustoconical portion.

In some examples, the seat further includes a pin disposed between the hub and the handle, the hub to selectively cause the pin to engage a pocket of the handle to lock the handle.

In some examples, the hub includes a cam to engage the pin when the handle is in the retracted position. In some such examples, the cam is spaced apart from the pin when the handle is in the extended position.

In some examples, the seat includes a backrest arm coupled to the hub and movement of the backrest arm from a first position to a second position is to cause the hub to rotate to enable the handle to move from the retracted position to the extended position.

An example seat to be coupled to a frame of a stroller is disclosed herein. The example seat includes a hub, a mount, and a lock disposed in the mount. The lock is to move from a first position to a second position to removably couple the seat to the frame. The example seat includes a pin disposed between the handle and the hub. The handle is moveable from a retracted position to an extended position when the pin is in a third position relative to the handle and the lock is to move from the second position to the first position when the handle moves from the retracted position to the extended position.

In some examples, the seat further includes a backrest arm to be rotatably coupled to the hub. In such examples, when the backrest arm is in a first position, the seat is in an unfolded position and when the backrest arm is in the second position, the seat is in a folded position. In some such examples, the handle includes a pocket. The pin is to be disposed in the pocket when the seat is in the unfolded position. In some such examples, the pin is to move relative to the pocket during movement of the backrest arm from the first position to the second position.

In some examples, the seat further includes a napper bar rotabably coupled to the hub, wherein rotation of the napper bar is to enable the handle to move between the retracted position and the extended position.

In some examples, the mount includes an actuator and the lock is to operatively coupled to the actuator. The handle is to cause the actuator to rotate when the handle moves from the retracted position to the extended position. The lock is to move relative to the frame based on the rotation of the actuator.

Turning to the figures, FIG. 1 is a right, front perspective view of an example stroller 100 constructed in accordance with the teachings of this disclosure. The example stroller 100 illustrated in FIG. 1 includes a frame 102 having a first side 104 and a second side 106. The first side 104 and the second side 106 of the stroller frame 102 include a plurality of frame members and wheels attached to the frame members. The frame members and wheels of the first side 104 of the stroller frame 102 will be described herein with the understanding that the second side 106 is a mirror image of the first side 104. Thus, the second side 106 includes substantially identical frame members and wheels as the first side 104 and, in the interest of brevity, will not be repeatedly detailed herein.

In the illustrated example stroller 100, the first side 104 includes an arm 108 extending from a parent handle 110. The parent handle 110 is disposed between the first side 104 and the second side 106 of the stroller frame 102. In some examples, the arm 108 and the parent handle 110 are integrally formed from a unit such as, for example, a tube. In some examples, a height of the parent handle 110 is adjustable via adjustment of height of the arm 108.

The first side 104 of the stroller frame 102 also includes a front leg 112 and a rear leg 114. A front wheel 116 is rotatably coupled to the front leg 112. In some examples, the front wheel 116 is rotatably coupled to a front bar 118 that extends between the first side 104 and the second side 106. A rear wheel 120 is coupled to the rear leg 114. In some examples, a rear wheel 120 is coupled to a rear bar 122 that extends between the first side 104 and the second side 106. Although the example stroller 100 of FIG. 1 includes four wheels (e.g., two front wheels 116 and two rear wheels 120 coupled to the first and second sides 104, 106 of the stroller frame 102), different numbers of front and/or rear wheels are used in other examples (e.g., a single front wheel).

In the illustrated example, the front leg 112 and the rear leg 114 are coupled via a joint 124. The rear leg 114 and the arm 108 are coupled via a hub 126 (e.g., a second joint). The joint 124 and the hub 126 facilitate folding of the stroller such that front leg 112 and the arm 108 and, thus, the parent handle 110 are free to rotate relative to the rear leg 114.

The example stroller 100 of FIG. 1 includes a first seat 128 disposed between the first side 104 and the second side 106 and a second seat 130 disposed between the first side 104 and the second side 106. In some examples, the stroller 100 only includes one seat 128, 130. In some examples, the seat(s) 128, 130 are arranged in different forward- or rearward-facing orientation(s) than illustrated in FIG. 1. For example, both seats 128, 130 can face forward or rearward relative to a direction of travel of the stroller 100 or can face in different directions (e.g., as illustrated in FIG. 1). Each of the first and second seats 128, 130 includes a seat frame 132 mounted to the stroller frame 102. The seat frame 132 defines a backrest portion 133 of the seat 128 (e.g., a portion against which an occupant of the seat rests his or back when sitting in the seat 128, 130) and a support portion 135 (e.g., a portion that supports a body of the seat occupant). The seat(s) 128, 130 can include accessories attached to the respective seat frames 132, such as soft goods, a canopy, a footrest, etc. In some examples, the second seat 130 is substantially the same as the first seat 128.

In the example stroller 100 of FIG. 1, the first seat 128 and the second seat 130 are removably coupled to the stroller frame 102 via respective seat mounts of the seat frames 132. The seat mount(s) of the seat(s) 128, 130 are coupled to a mount bar of the stroller frame 102. For example purposes, the removable coupling of a seat to the stroller frame 102 will be discussed in connection with the first example seat 128 of FIG. 1, with the understanding the second example seat 130 can be coupled to the stroller frame 102 in the same or substantially the same manner as disclosed in connection with the first seat 128.

Figure 2:
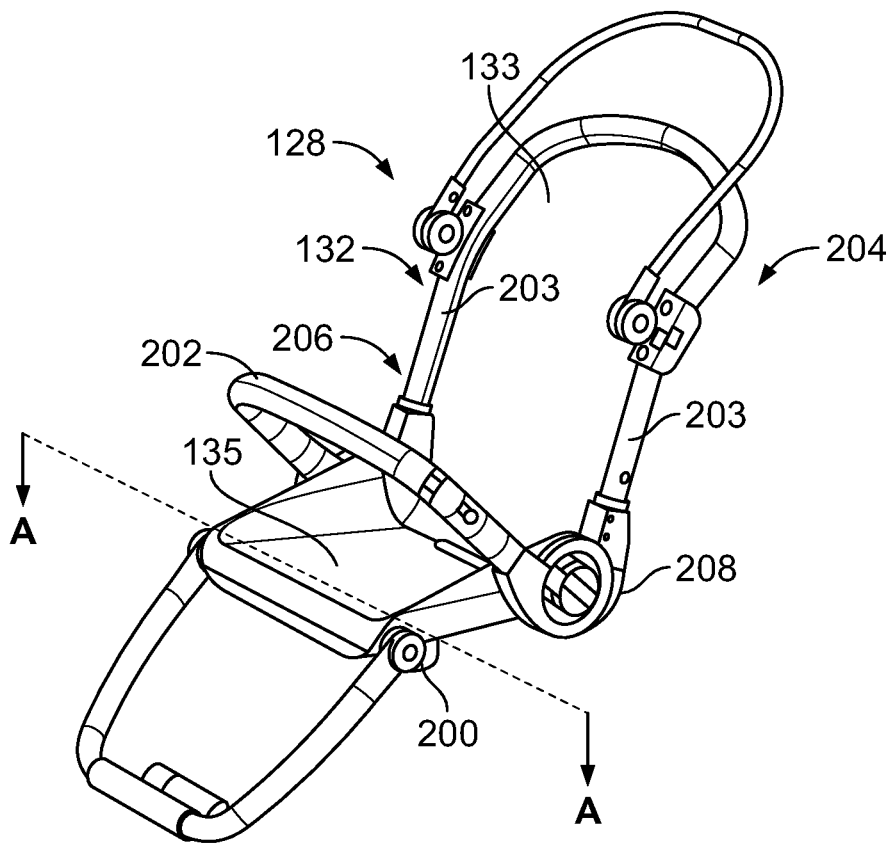
FIG. 2 is a right, front perspective view of an example seat including a seat mount that may be coupled to the example stroller frame of FIG. 1 in accordance with the teachings of this disclosure.

FIG. 2 is a right, front perspective view of the first example seat 128 of FIG. 1. The example seat 200 includes means for coupling the seat 128 to a mount bar of the stroller frame. As shown in FIG. 2, the first example seat 128 includes a seat mount 200 coupled to the seat frame 132. In operation, the seat mount 200 is coupled to a ground-facing surface of the support portion 135 of the seat frame 132, or side of the seat frame 132 opposite a side on which a child sits. As also shown in FIG. 2, the first example seat 128 includes a napper bar 202 extending between a first side 204 and a second side 206 of the seat frame 132. The napper bar 202 is coupled to the seat frame 132 via respective seat connection hubs 208 disposed at the first side 204 (shown in FIG. 2) and the second side 206 of the seat frame 132. The seat connection hubs 208 enable rotation of the napper bar 202 relative to the seat frame 132 when a user exerts a force on the napper bar 202 (e.g. presses down on the napper bar 202).

The example seat frame 132 also includes backrest arms 203 at the first and second sides 204, 206 of the seat 128 that define the backrest portion 133 of the seat 128. The backrest arms 203 are rotatably coupled to the respective seat connection hubs 208. In some examples, the backrest arms 203 rotate substantially simultaneously via the hubs 208. The backrest arm 203 can rotate toward the napper bar 202 (e.g., to fold the seat 128) or away from the napper bar 202 (e.g., to adjust a recline angle of the backrest portion 133 of the seat 128). As disclosed below in connection with FIGS. 3-8, the example napper bar 202 and the backrest arms 203 can be selectively rotated by a user via the seat connection hubs 208 to release seat mount 200 from the stroller frame 102 such that the first example seat 128 can be removed or detached from the stroller frame 102. In some examples, the napper bar 202 and the backrest arms 203 are selectively rotated via the seat connection hubs 208 to couple the seat 128 to the stroller frame 102.

Figure 3:
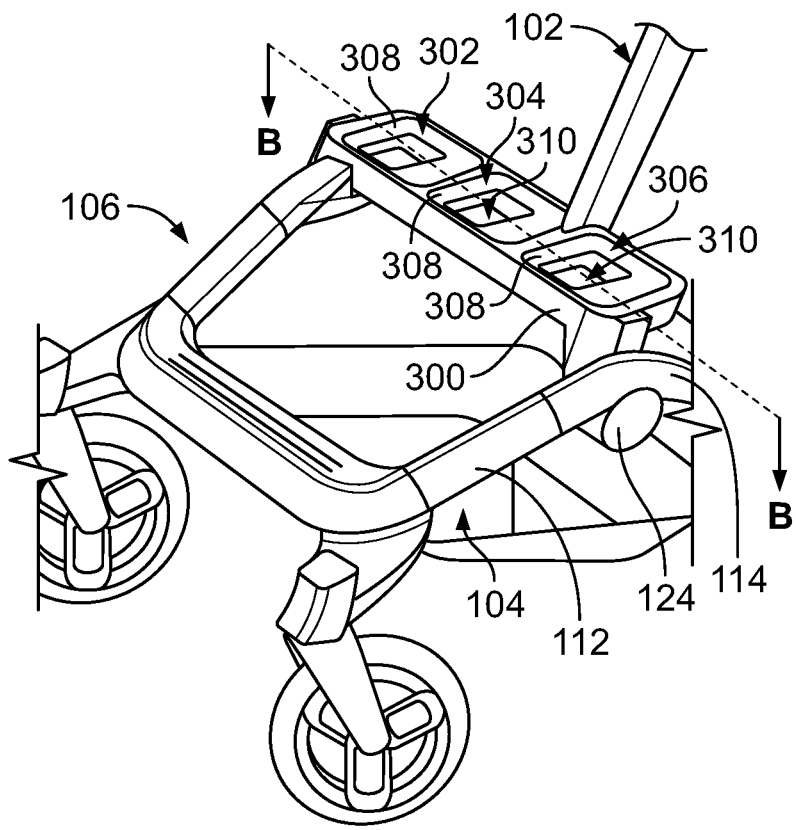
FIG. 3 is a partial, right, front perspective view of the example stroller of FIG. 1 including a mount bar having a plurality of mount receivers to receive the seat mount of the example seat of FIG. 2.

FIG. 3 is a partial, right, front perspective view of the example stroller of FIG. 1. As shown in FIG. 3, the example stroller frame 102 includes a mount bar 300. The mount bar 300 extends between the first and second sides 104, 106 of the stroller frame 102. In the example of FIG. 3, the mount bar 300 is disposed proximate to the joint 124 between the front leg 112 and the rear leg 114 of the stroller frame 102. In some examples, the mount bar 300 of FIG. 3 is a cast part coupled to the example stroller frame 102. In some examples, the mount bar 300 is integral with the stroller frame 102.

The example mount bar 300 of FIG. 3 includes means for receiving a seat mount of a seat, such as the example seat mount 200 of the first seat 128 of FIG. 2. For example, the example mount bar 300 of FIG. 3 includes a first mount receiver 302, a second mount receiver 304, and a third mount receiver 306. The first, second, and third mount receiver(s) 302, 304, 306 can include cavities or openings 310 formed in the mount bar 300. In some examples, the mount bar 300 and the first, second, and third mount receivers 302, 304, 306 are formed from a single mold. In other examples, the first, second, and third mount receiver(s) 302, 304, 306 are formed separately from the mount bar 300 and coupled to the mount bar 300 (e.g., via fastener(s) such as screw(s)). The example mount bar 300 and the first, second, and third example mount receivers 302, 304, 306 can be formed via one or more manufacturing methods including, for example, injection molding, arrangement of multiple pieces, laser etching, and/or three-dimensional printing. The example mount bar 300 can include additional or fewer mount receivers than illustrated in FIG. 3. Also, although the first, second, and third mount receivers 302, 304, 306 are arranged linearly along the mount bar 300, the receivers can be arranged in other patterns such as, for example, a triangular pattern.

In the example of FIG. 3, the each of the first, second, and third example mount receivers 302, 304, 306 are substantially identical with respect to shape and size. For example, the first, second, and third mount receivers 302, 304, 306 include a shell 308 having a substantially frustoconical or funnel-shape. The first, second, and third mount receivers 302, 304, 306 can have other shapes, such as substantially circular shapes, substantially square shapes, and/or can include portions having different shapes. The interior of the shell 308 of each of the mount receivers 302, 304, 306 defines a cavity or opening 310. As disclosed herein, the shapes of the first, second, and third mount receivers 302, 304, 306 complements a shape of a mount of a seat (e.g., the seat mount 200 of FIG. 2) or an accessory to be coupled to the stroller frame 102.

In the example of FIG. 3, the first mount receiver 302 is disposed proximate to the second side 106 of the stroller frame 102, the third mount receiver 306 is disposed proximate to the first side 104 of the stroller frame, and the second mount receiver 304 is disposed between the first mount receiver 302 and the second mount receiver 306 (e.g., proximate to a longitudinal axis extending through a center of the mount bar 300). Thus, one or more seats and/or accessories can be coupled to the stroller frame 102 at different positions. The example stroller frame 102 of FIGS. 1 and 3 can support a single seat or accessory and/or two more seats or accessories in any of the mount receivers without the risk the stroller frame 102 becomes unstable.

For example, the first seat 128 can be mounted to the stroller frame 102 via the second mount receiver 304 such that a longitudinal axis extending through a center of the first seat 128 is substantially aligned with a longitudinal axis extending through a center of the mount bar 300. In other examples, a center of the first seat 128 is positioned right or left relative to the center of the mount bar 300 via the first mount receiver 302 or the third mount receiver 306. Put another way, the center of the first seat 128 can be disposed closer to the first side 104 or the second side 106 of the example stroller 100. In some examples, the first seat 128 is coupled to the first mount receiver 302 and the second seat 130 is coupled to the third mount receiver 306 (e.g., as illustrated in FIG. 1). In some such examples, a portion of the seat frame 132 may overhang in the stroller frame 102 when the first seat 128 and/or the second seat 130 is coupled proximate to the first or second sides 104, 106 of the stroller frame 102 via the first and/or third mount receivers 302, 306. In some examples, the seat(s) and/or accessories can be coupled to the first, second, and/or third mount receivers 302, 304, 306 in a forward-facing direction or a rearward-facing direction relative to a direction of travel of the stroller 100. In some examples, the seat(s) and/or accessories can be coupled to the stroller frame 102 sideways relative to the direction of travel (e.g., via the first mount receiver 302 and/or the third mount receiver 306).

Figure 4:
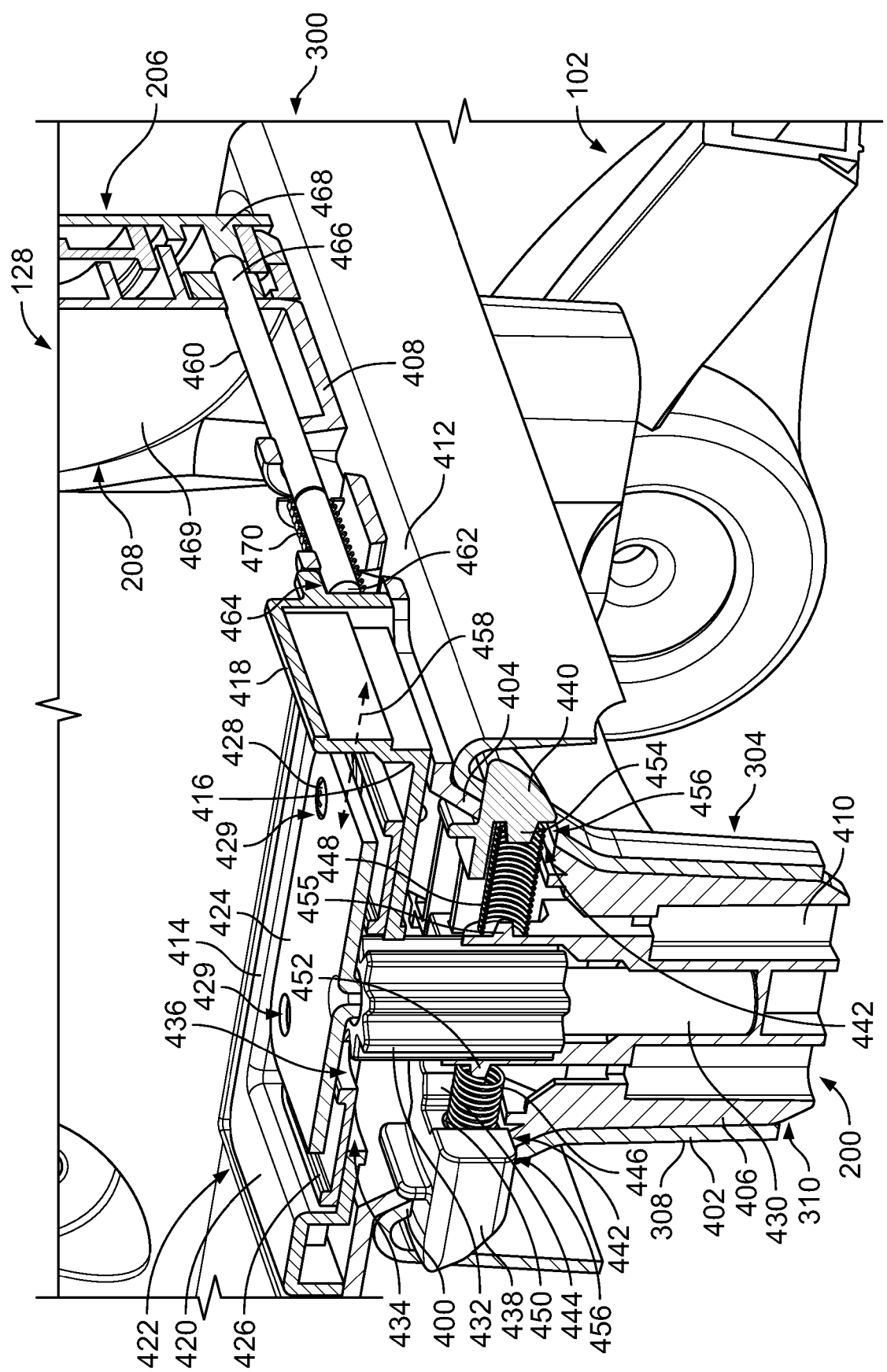
FIG. 4 is a cross-sectional view of the example seat mount taken along the A-A line of FIG. 2 and a mount receiver of the example mount bar taken along the B-B line of FIG. 3, the seat mount locked to the mount receiver.

FIG. 4 is a cross-sectional view of the example seat mount 200 of the first example seat 128 taken along the A-A line of FIG. 2 and the second example mount receiver 304 of the example mount bar 300 taken along the B-B line of FIG. 3. In the example of FIG. 4, the seat mount 200 is locked to the second mount receiver 304 and, thus, the first example seat 128 is coupled to the stroller frame 102. Although FIG. 4 is discussed in connection with the first example seat 128, another seat (e.g., the second example seat 130 of FIG. 1) and/or accessory (e.g., a basket) can be coupled to the stroller frame 102 in a substantially similar manner as disclosed herein. Also, although FIG. 4 is discussed in connection with the second (e.g., middle) mount receiver 304 of the mount bar 300 of FIG. 3, the seat mount 200 of the example seat 128 (or another seat and/or accessory) can be coupled to the stroller frame 102 via the first mount receiver 302 and/or the third mount receiver 306 in substantially the same manner as disclosed herein in connection with the second mount receiver 304.

As illustrated in FIG. 4, the second mount receiver 304 of the example mount bar 300 and the seat mount 200 of the first example seat 128 have complementary shapes. In the example of FIG. 4, the shell 308 of the second mount receiver 304 has a substantially frustoconical portion 400 and a substantially square portion 402. In some examples, the substantially square portion 402 includes a surface on which the seat mount 200 rests when disposed in the second mount receiver 304 (e.g., the cavity 310 is close-ended). In other examples, the substantially square portion 402 does not include such a surface (e.g., the cavity 310 is open-ended). Also, the seat mount 200 has a substantially frustoconical portion 404 and a substantially square portion 406 such that the seat mount 200 can be inserted into the cavity 310 of the second mount receiver 304. In operation, the complementary shapes of the second mount receiver 304 of the stroller frame 102 and the seat mount 200 of the seat 128 provide for coupling of the seat 128 to the stroller frame 102 without requiring exact alignment between the seat mount 200 and the cavity 310 of the second mount receiver 304 when the user is inserting the seat mount 200 into the cavity 310. In particular, because of the frustoconical portion 400 of the second example mount receiver 304, the seat mount 200 is guided into the second mount receiver 304 without requiring precise alignment of the seat mount 200 and the second mount receiver 304 by the user. For example, to insert the seat mount 200 in the second mount receiver 304, the user positions the seat mount 200 of the seat 128 over the second mount receiver 304 and lowers the seat 128 onto the stroller frame 102 such that the seat mount 200 is received in the cavity 310 of the second mount receiver 304. In some examples, the user may not have aligned (e.g., exactly aligned) the respective square end portions 402, 406 of the second mount receiver 304 and the seat mount 200. As a result, the square end portion 406 of the seat mount 200 enters the second mount receiver 304 at an angle or offset relative to the square end portion 402 of the second mount receiver 304. In such examples, the frustoconical portion 400 of the second mount receiver 304 facilities placement of the square end portion 406 of the seat mount 200 into the square end portion 402 of the second mount receiver 304. In particular, the curved or sloped surface of the frustoconical portion 400 allows the square end portion 406 of the seat mount 200 to slide into the square end portion 402 of the second mount receiver 304 to couple the example seat 128 to the example stroller frame 102. Thus, the second example mount receiver 304 provides for self-alignment of the seat mount 200, thereby reducing potential user difficulties in coupling the seat 128 to the stroller frame 102 and any risks that the seat 128 is not securely coupled to the stroller frame 102.

Referring the example seat mount 200 of the first example seat 128, the seat mount 200 includes a base 408 and means for coupling the seat mount 200 to the mount bar 300, or a coupler 410 extending from the base 408. The coupler 410 can include a protrusion extending from the base 408. As illustrated in FIG. 4, when the seat mount 200 is coupled to the mount bar 300, the coupler 410 is disposed in the cavity 310 of the second mount receiver 304 and the base 408 is disposed on (e.g., sits on) a surface 412 of the mount bar 300. The base 408 can be coupled to a surface of the seat 128 (e.g., the ground-facing surface of the support portion 135 of the stroller frame 132) or an accessory via one or more mechanical or chemical fasteners.

The example seat mount 200 includes means for releasing the seat mount 200 from one of the mount receivers 302, 304, 306 of the mount bar 300. For example, the seat mount 200 includes a release handle 414. A first end 416 of the example release handle 414 includes a grip portion 418 that can be accessed by a user. A second end 420 of the release handle 414 is disposed in a slot 422 defined by the base 408 of the seat mount 200. In the example of FIG. 4, the grip portion 418 of the release handle 414 is disposed proximate to the backrest portion 133 of the seat 128 (e.g., FIGS. 1, 2). Such a location of the grip portion 418 of the release handle 414 prevents unintended access to the release handle 414 by the occupant of the seat 128 during use of the stroller 100.

In the example of FIG. 4, a first plate 424 is coupled to the second end 420 of the release handle 414. A second plate 426 is disposed between the first plate 424 and the second end 420 of the release handle 414. The second plate 426 is slidably coupled to the release handle 414. As disclosed herein, when the release handle 414 moves from a locked positon to an unlocked position, the second plate 426 slides relative to the coupler 410 to unlock the seat mount 200 from the mount bar 300. The release handle 414 and the second plate 426 are slidably coupled to the base 408 via fasteners 428 that extend through openings 429 in the first plate 424, openings in the second plate 426, and openings in the release handle 414.

Figure 5:
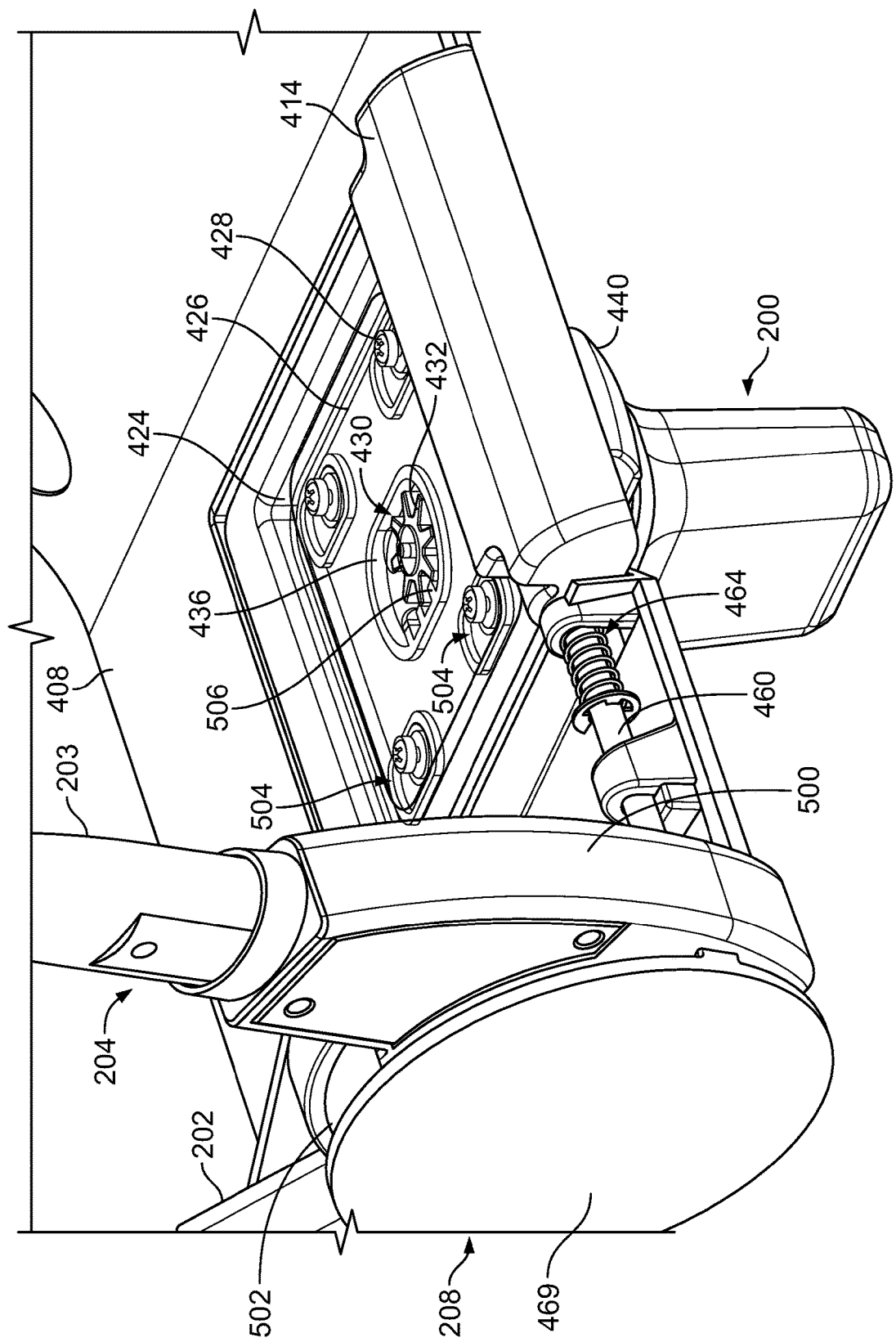
FIG. 5 is a left, rear perspective view of the example seat mount and a partial view of an example seat connection hub, napper bar, and a backrest arm of the example seat of FIG. 2.

The example seat mount 200 includes means for driving the locking of the seat mount 200 to the second mount receiver 304. For example, the seat mount 200 of FIG. 4 includes an actuator 430 disposed in the coupler 410. The actuator 430 includes a pinion 432. As illustrated in FIG. 4, the pinion 432 extends through a first opening 434 formed in the release handle 414 and second opening 436 formed in the second plate 426. As disclosed herein, the pinion 432 selectively engages a rack 506 of the second plate 426 (FIG. 5). The actuator 430 is coupled to the first plate 424 (e.g., via an interference fit between a portion of the first plate 424 and the actuator 430 via a mechanical fastener, etc.).

The example seat mount 200 includes means for locking the seat mount 200 to the second mount receiver 304. For example, the seat mount 200 of FIG. 4 includes a first lock 438 and a second lock 440. The first and second locks 438, 440 are disposed in respective openings 442 formed in the coupler 410. Each of the first and second locks 438, 440 includes teeth 444. The pinion 432 of the actuator 430 selectively engages the teeth 444 of the first and second locks 438, 440. In some examples, the first and second locks 438, 440 are mirror images of one another.

The example seat mount 200 includes means for driving the means for locking the seat mount 200 to the second mount receiver 304. For example, a first spring 446 is disposed between the first lock 438 and the actuator 430. A second spring 448 is disposed between the second lock 440 and the actuator 430. As illustrated in FIG. 4, the first spring 446 is disposed between a wall 450 of the first lock 438 and a first projection 452 formed in the coupler 410 proximate to the actuator 430 and the second spring 448 is disposed a wall 454 between the second lock 440 and a second projection 455 formed in the coupler 410 proximate to the actuator 430. The first and second locks 438, 440 move between extended and retracted positions via compression and extension of the first and second springs 446, 448 during locking of the seat mount 200 to and unlocking of the seat mount 200 from the second example mount receiver 304. When the coupler 410 is disposed in the second example mount receiver 304, the first and second springs 446, 448 are in extended positions. In particular, forces exerted by the first and second springs 446, 448 push the respective first and second locks 438, 440 outward relative to the actuator 430, through the openings 442 of the coupler 410 and into respective notches 456 formed in the second mount receiver 304 to couple the seat mount 200 to the mount receiver 304.

The retraction and expansion of the first and second locks 438, 440 is controlled by the sliding of the release handle 414 into and partially out of the slot 422 of the base 408, as represented by the arrow 458 of FIG. 4. For example, a user can grasp the grip portion 418 to pull the release handle 414 outward relative to the seat mount 200. As disclosed herein, when the user pulls the grip portion 418 of the release handle 414 outward relative to the seat mount 200, the second plate 426 slides with the release handle 414, and the rack 506 of the second plate 426 causes the pinion 432 of the actuator 430 to rotate and the first and second locks 438, 440 to move from the expanded position shown in FIG. 4 to a retracted position.

The example seat mount 200 includes means for controlling the release handle 414. In the example of FIG. 4, the ability of the user to pull the release handle 414 is controlled by a lock pin 460 disposed between the release handle 414 and the seat connection hub 208 of the first example seat 128 of FIG. 4. In the example of FIG. 4, a first end 462 of the lock pin 460 is disposed in a pocket 464 of the release handle 414. A second end 466 of the lock pin 460 selectively engages means for positioning the lock pin 460 relative to the pocket 464. For example, the second end 466 of the lock pin 460 engages a cam 468 disposed in a housing 469 of the seat connection hub 208. Although in FIG. 4 the lock pin 460 is shown as engaging the seat connection hub 208 located at the second side 206 of the first example seat 128, the lock pin 460 could alternatively engage the seat connection hub 208 located at the first side 204 of the first example seat (FIG. 2). In some examples, the seat mount 200 includes two lock pins 460 that engage the respective seat connection hubs 208 located at the first and second sides 204, 206 of the first example seat 128. In such examples, the release handle 414 includes two pockets 464 to receive the respective lock pins 460.

The example lock pin 460 includes means for driving the lock pin 460. In the example of FIG. 4, the lock pin 460 includes a spring 470. In the example of FIG. 4, when the lock pin 460 engages the cam 468 and the spring 470 is compressed, the spring-loaded lock pin 460 is disposed in the pocket 464 of the release handle 414. In such examples, the lock pin 460 prevents sliding of the release handle 414 (e.g., the user cannot pull the grip portion 418 outward relative to the seat mount 200) due to the presence of the lock pin 460 in the pocket 464. As disclosed in greater detail below, rotation of the backrest arm(s) 203 and the napper bar 202 (FIG. 2) via the seat connection hub 208 causes the lock pin 460 to move out of the pocket 464 of the release handle 414. In examples including two lock pins 460, rotation of the seat connection hubs 208 can cause the lock pins 460 to move out of the pockets 464 at substantially the same time. The release of the lock pin(s) 460 from the pocket(s) 464 enables the grip portion 418 of the release handle 414 to be pulled by the user, which causes the first and second locks 438, 440 to retract and the seat mount 200 to be removed from the second mount receiver 304.

FIG. 5 is a left, rear perspective view of the example seat mount 200 and a partial view of one of the seat connection hub 208, the napper bar 202 and one of the backrest arms 203 of the first example seat 128 of FIG. 2. In some examples of FIG. 5, the seat mount 200 is coupled to first, second, or third mount receivers 302, 304, 306 of the example mount bar 300 of the stroller 100 of FIGS. 1 and 3. However, for illustrative purposes, the mount bar 300 and the mount receivers 302, 304, 306 are not shown in FIG. 5. In other examples of FIG. 5, the seat mount 200 is not coupled (or not yet coupled) to the mount bar 300.

As shown in FIG. 5, the lock pin 460 is disposed in the pocket 464 of the release handle 414. As disclosed above, although the lock pin 460 is shown proximate to the first side 204 of the seat 128 in FIG. 5, the lock pin 460 could be disposed proximate to the second side 206 of the seat 128 (e.g., as in FIG. 4). In some examples, a first lock pin 460 is disposed proximate to the second side 206 of the seat 128 and a second lock pin 460 is disposed proximate to the first side 204 of the seat 128.

As also shown in FIG. 5, the backrest arm 203 is coupled to the seat connection hub 208 via a first connector 500. The first connector 500 is at least partially disposed in the housing 469 of the hub 208. The first connector 500 is pivotably coupled to the housing 469 to enable the backrest arm 203 to move between one or more angular positions relative to the housing 469. Also, the napper bar 202 is coupled to the seat connection hub 208 via a second connector 502. The second connector 502 is pivotably coupled to the housing 469 to enable the napper bar to move between one or more angular positions relative to the housing 469. In the example of FIG. 5, the backrest arm 203 is in a first angular position and the napper bar 202 is in a second angular position spaced apart from the backrest arm 203. In some examples, the first angular position of the backrest arm 203 corresponds to a position in which the backrest portion 133 of the seat 128 is in a substantially upright position (e.g., substantially perpendicular relative to the support portion 135 of FIG. 1, at a recline relative to the support portion 135) such that an occupant of the seat 128 could rest his or her back against the backrest portion 133.

For illustrative purposes, the first plate 424 is shown as transparent relative to the second plate 426 in FIG. 5. As shown in FIG. 5, the second plate 426 includes openings 504 through which the fasteners 428 extend to couple the first and second plates 424, 426 and the release handle 414 to the base 408. As also shown in FIG. 5, the second plate 426 includes the rack 506 having a plurality of teeth at least partially extending in the opening 436 of the second plate 426. The pinion 432 of the actuator 430 selectively engages the rack 506, as disclosed above. As also shown in FIG. 5, the second lock 440 is in an expanded position (and the first lock 438 is in an expanded position as shown in FIG. 4).

Figure 6:
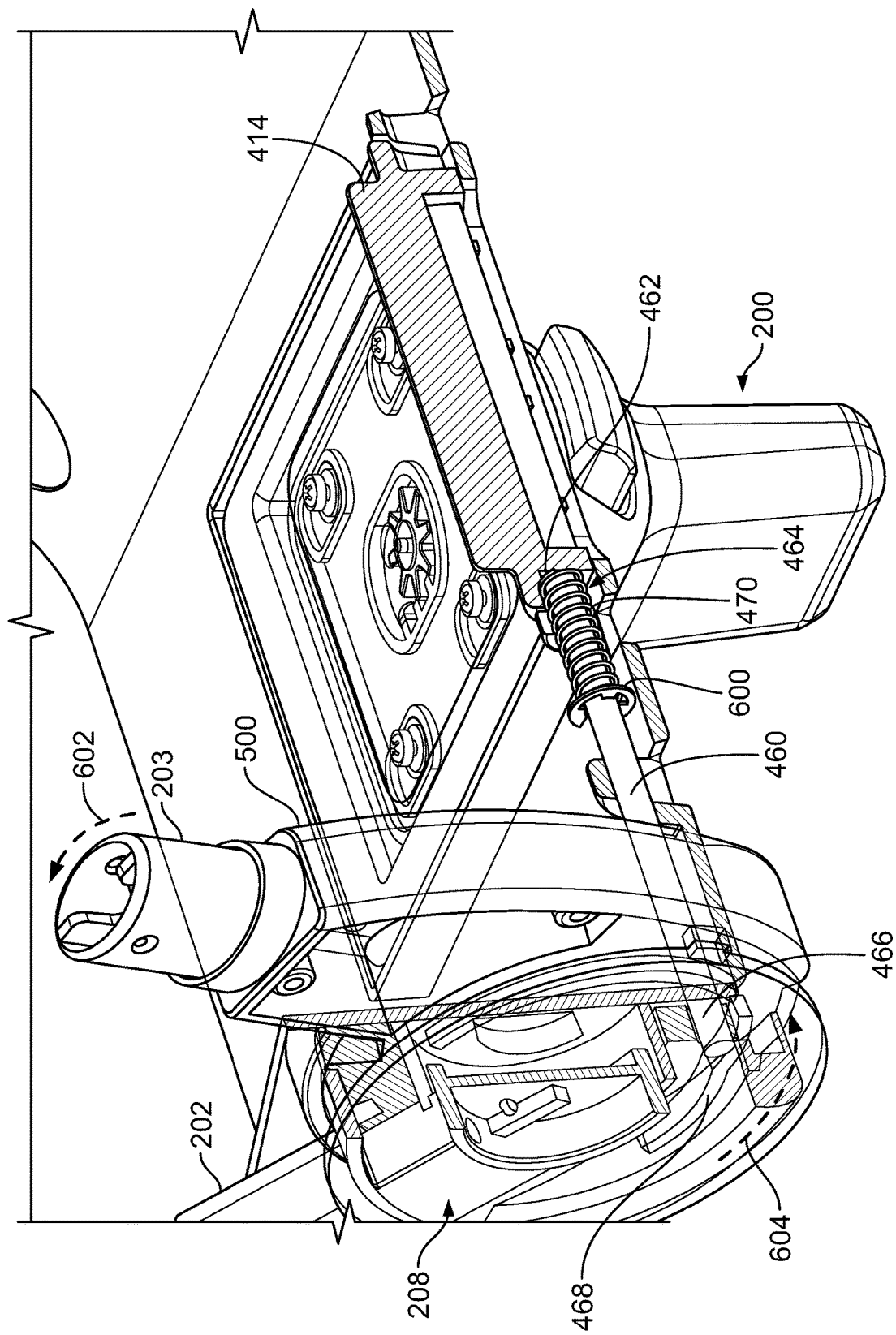
FIGS. 6-8 are left, rear perspective views of the example seat mount and seat connection hub of FIG. 5, showing the backrest arm and napper bar in different angular positions.
Figure 7:
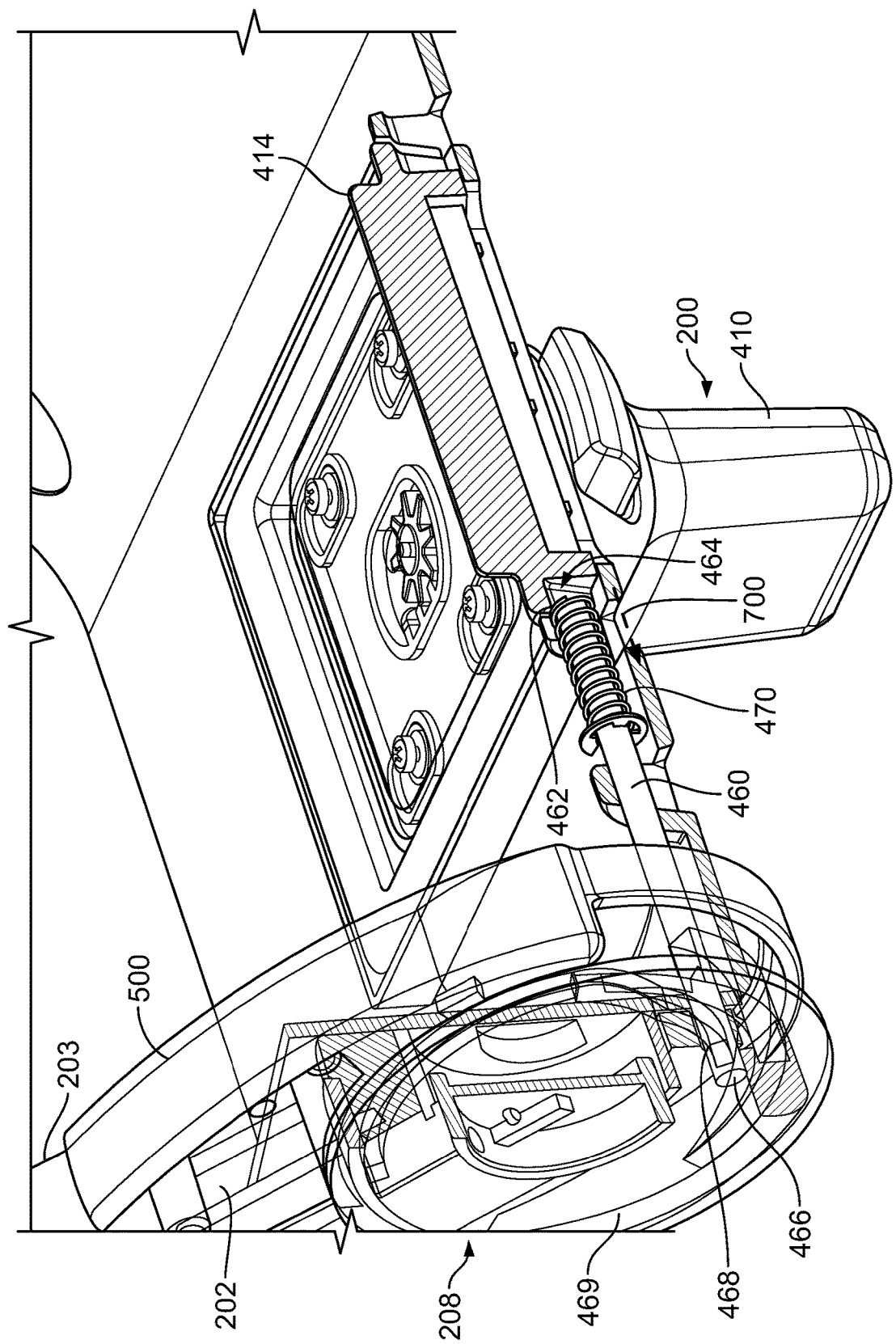
Figure 8:
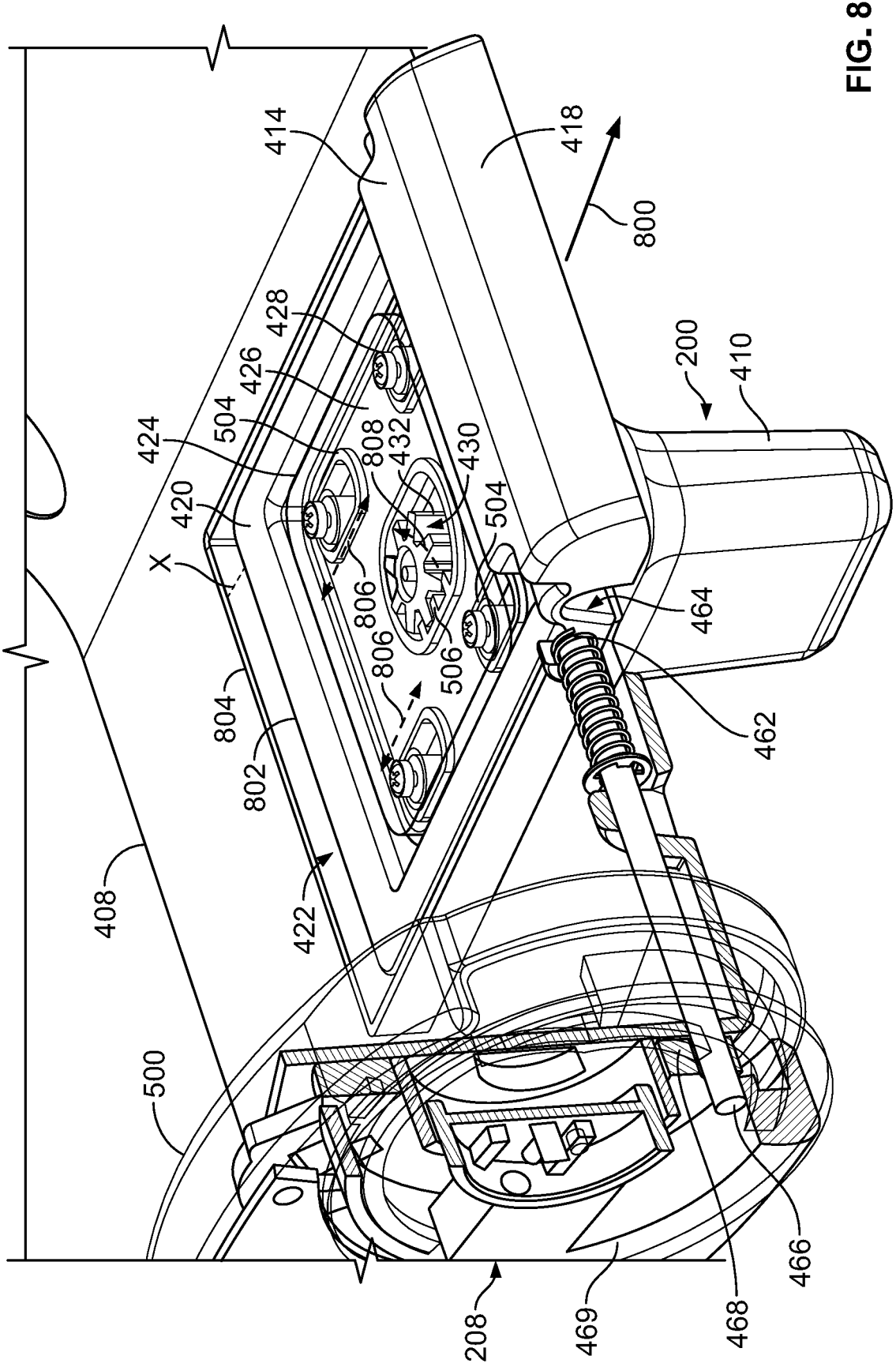

In some examples, the user may wish to retract the locks 438, 440 of the seat mount 200 to enable the seat 128 to be removed from the stroller frame 102. In other examples, the user may wish to retract the locks 438, 440 to facilitate insertion of the seat mount 200 into the first, second, or third mount receivers 302, 304, 306 of the mount bar 300. FIGS. 6-8 illustrate the unlocking of the release handle 414 via the locking pin 460, which enables the user to pull the release handle 414 to retract the locks 438, 440 of the seat mount 200.

FIGS. 6-8 are left, rear perspective views of the example seat mount and seat connection hub of FIG. 5, showing the backrest arm and napper bar in different angular positions. For illustrative purposes, a portion of the release handle 414 is shown in a cutaway view with respect to the pocket 464 for receiving the lock pin 460 in FIGS. 6 and 7. Although FIGS. 6-8 illustrate one lock pin and seat connection hub, the release of lock pin 460 shown in FIGS. 6-8 can apply to examples including two lock pins 460 associated with the seat connection hubs 208 at each side of the seat 128.

As illustrated in FIG. 6, the second end 466 of the lock pin 460 engages the cam 468 of the seat connection hub 208. In the example of FIG. 6, the cam 468 is coupled to the first connector 500 of the seat connection hub 208, or the connector to which the backrest arm 203 is coupled. In some examples, the first connector 500 and the cam 468 are formed from one or more molds, from two or more separate pieces mechanically or chemically coupled together, etc. Also, in FIG. 6, the spring 470 is in a compressed position. As shown in FIG. 6, the spring 470 is disposed between a collar 600 of the lock pin 460 and the pocket 464. Thus, first end 462 of the lock pin 460 is held in the pocket 464 of the release handle 414 by the engagement of the second end 466 of the lock pin 460 with cam 468, which acts on the spring 470.

To release the lock pin 460 from the pocket 464 of the release handle 414, the user rotates the backrest arm 203 toward the napper bar 202 (e.g., pushes the backrest arm 203 toward the support portion 135 of the seat 128), as represented by the arrow 602 of FIG. 6. The first connector 500 rotates via the seat connection hub 208, which enables the backrest arm 203 coupled thereto to move toward the napper bar 202. As the backrest arm 203 pivots toward the napper bar 202, the cam 468 moves away from the second end 466 of the lock pin 460 due to the movement (e.g., rotation) of the first connector 500, as represented by the arrow 604 of FIG. 6. Put another way, during rotation of the backrest arm 203 and the first connector 500, the cam 468 becomes spaced apart from the second end 466 of the lock pin 460 such that the cam 468 no longer engages the second end 466 of the lock pin 460.

As the backrest arm 203 rotates toward the napper bar 202 via the first connector 500 and the seat connection hub 208, the second end 466 of the lock pin 460 no longer engages the cam 468. Thus, the tension of the spring 470 is released and the spring 470 moves from a compressed position to an extended position. As a result of the release of the spring 470, the first end 462 of the lock pin 460 moves out of the pocket 464 and no longer engages the pocket 464 (e.g., the first end 462 is moved a distance from the pocket 464), as represented by the arrow 700 of FIG. 7. Put another way, the lock pin 460 is sprung back relative to the pocket 464.

In some examples, as the user rotates the backrest arm 203, the backrest arm 203 engages the napper bar 202, which causes the napper bar 202 to move toward the support portion 135 of the seat 128. Thus, in some examples, the seat 128 folds or substantially folds as a result of the rotation of the backrest arm(s) 203 and the napper bar 202 such that the backrest portion 133 is disposed proximate to the support portion 135, which is disclosed below in FIG. 9.

As shown in FIG. 8, when the backrest arm 203 and the napper bar 202 are rotated such that the backrest arm 203 and napper bar 202 are substantially collapsed, the lock pin 460 is no longer disposed in the pocket 464 of the release handle 414. Thus, the release handle 414 is free to slide relative to the slot 422 of the base 408. As represented by the arrow 800 in FIG. 8, a user can grasp the grip portion 418 of the release handle 414 and pull the release handle 414 outward relative to the coupler 410 of the seat mount 200.

As a result of the pulling of the release handle 414, an edge 802 of the second end 420 of the release handle 414 moves a distance x away from an edge 804 of the slot 422.

When the user pulls the release handle 414 outward, the second plate 426 of the seat mount 200 slides with the release handle 414. For example, the openings 504 of the second plate 426 move (e.g., slide) relative to the fasteners 428 extending through the openings 504 from the first plate 424, as represented by the arrows 806 of FIG. 8. The sliding of the second plate 426 causes the pinion 432 of the actuator 430 to rotate as a result of the engagement of the pinion 432 with the rack 506, as represented by the arrow 808 of FIG. 8. In some examples, the amount by which the second plate 426 slides and, thus, the distance x by which the release handle 414 slides relative to the edge 804 of the slot 422 is defined by a size and/or a number of teeth of the rack 506, a length of the openings 436, 504 of the second plate 426 (e.g., a length of the major axes of the openings 436, 504 in examples where the openings are elliptical shape), etc. As disclosed above, the rotation of the pinion 432 causes the locks 438, 440 of the seat mount 200 to retract.

Figure 9:
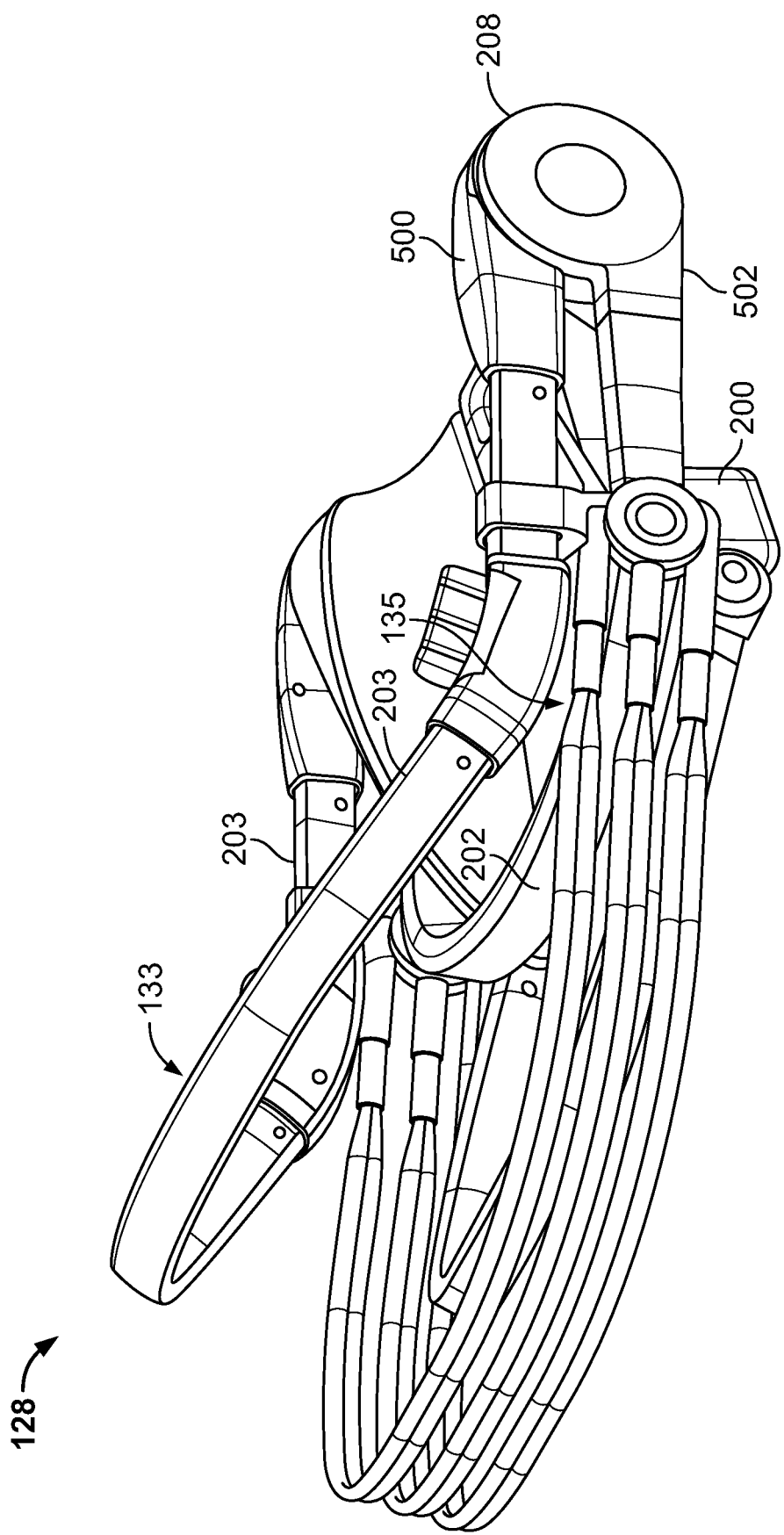
FIG. 9 is a right, perspective view of the example seat of FIG. 2, including the backrest arm and the napper bar in folded positions.

FIG. 9 is a right, perspective view of the example seat 128 in a substantially folded position, or a position in which the backrest arm(s) 203 and the napper bar 202 are substantially collapsed and, thus, the backrest portion 133 is disposed proximate to the support portion 135. For example, a user may rotate the backrest arm(s) 203 and the napper bar 202 via the seat connection hub 208 to the positions shown in FIG. 9 to unlock lock pin 460 from the release handle 414 as disclosed above in connection with FIGS. 5-8. In addition to releasing the lock pin 460 to enable the user to pull the release handle 414 of the seat mount 200, the folded position of the seat 128 shown in FIG. 9 provides for increase ease of access to the release handle 414 as compared to if the user had to reach around and under the backrest portion 133 of the seat 128 while the backrest portion 133 was substantially upright. In some examples, a degree to which the backrest arm 203 and the napper bar 202 rotate and the seat 128 folds is defined by the seat connection hub 208 (e.g., one or more stops disposed in the housing 469 of the seat connection hub 208).

Figure 10:
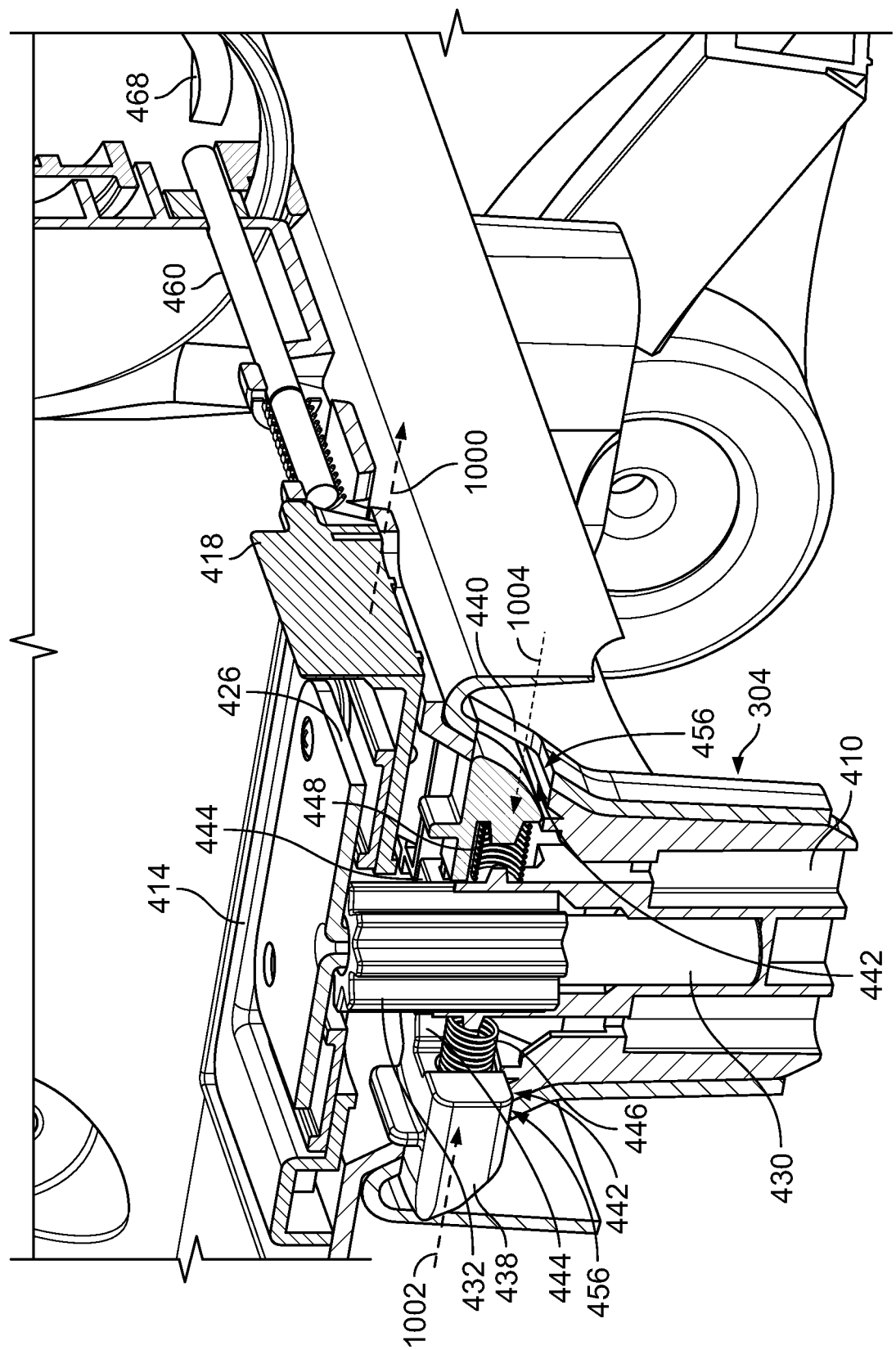
FIG. 10 is a cross-sectional view of the example seat mount taken along the A-A line of FIG. 2 and a mount receiver of the example mount bar taken along the B-B line of FIG. 3, the seat mount in a partially unlocked position relative to the mount receiver.

FIG. 10 is a cross-sectional view of the example seat mount 200 of the first example seat 128 taken along the A-A line of FIG. 2 and the second example mount receiver 304 of the example mount bar 300 taken along the B-B line of FIG. 3, with the seat mount 200 assembled in the second mount receiver 304. In the example of FIG. 10, the seat mount 200 is partially unlocked to the second mount receiver 304 (i.e., as compared to the example of FIG. 4 in which the seat mount 200 is locked to the second mount receiver 304).

As shown in FIG. 10, the lock pin 460 is disengaged from the cam 468 (e.g., as a result of rotation of the backrest arm 203 and the napper bar 202) and the first end 462 of the lock pin 460 is removed from the pocket 464 of the release handle 414. Thus, the release handle is free to be pulled outward relative to the coupler 410 (e.g., via the grip portion 418), as represented by the arrow 1000 of FIG. 10.

As disclosed above, when the release handle 414 is pulled outward relative to the coupler 410, the second plate 426 slides with the release handle 414. The sliding of the second plate 426 causes the pinion 432 of the actuator 430 to rotate via the rack 506 of the second plate 426 (FIGS. 5, 8). As the pinion 432 rotates as a result of the sliding of the second plate 426 in the direction of the movement of the release handle 414, the pinion 432 engages the teeth 444 of the first and second locks 438, 440. The rotation of the pinion 432 and the engagement of the pinion 432 with the teeth 444 of the first and second locks 438, 440 causes the first and second locks 438, 440 to be pulled inward toward the actuator 430 and the first and second springs 446, 448 to move to compressed position. As a result, the first and second locks 438, 440 retract from the notches 456 of the second mount receiver 304, as represented by the arrows 1002, 1004 of FIG. 10. In examples, the first and second locks 438, 440 are at least partially retracted relative to the respective openings 442 of the coupler 410.

Figure 11:
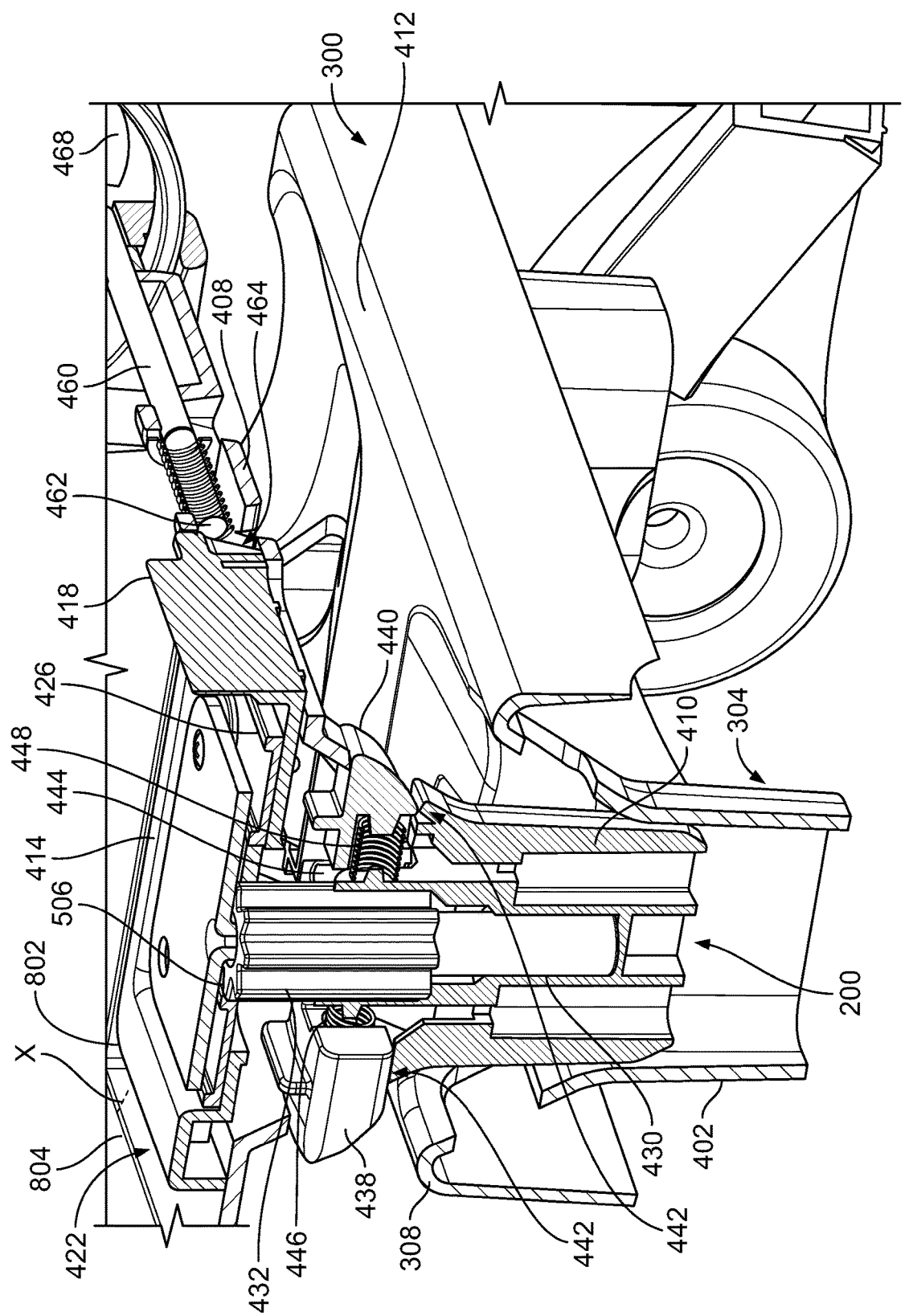
FIG. 11 a cross-section view of the example seat mount and the example mount bar of FIG. 10, the seat mount unlocked from the mount receiver.

FIG. 11 shows the example seat mount 200 removed from the second mount receiver 304. As illustrated in FIG. 11, the retraction of the locks 438, 440 from the notches 456 of the second mount receiver 304 enables the seat mount 200 to be removed from the second mount receiver 304 (and, thus, the seat or accessory to which the seat mount 200 is coupled from the stroller 100). For example, a user may lift the seat 128 out of the second mount receiver 304 while grasping, for example, the grip portion 418 of the release handle 414 and one or more portions of the seat 128, such as the support portion 135.

If the user wishes to re-attach the first example seat 128 including the seat mount 200 or to couple another seat or accessory having the seat mount 200 to the mount bar 300, the user inserts the seat mount 200 into the second mount receiver 304 (or the first or third mount receivers 302, 306) by aligning or substantially aligning the coupler 410 of the seat mount 200 with the substantially square portion 402 of the shell 308 of the second mount receiver 304. In some examples, the release handle 414 is in an unlocked position when the seat mount 200 is inserted into the mount receiver 340 (e.g., as a result of a user folding the backrest arm 203 so as to release the lock pin 460 and holding and/or pulling the grip portion 418 of the release handle 414 while inserting the seat mount 200 into the second mount receiver 304). Thus, the first and second locks 438, 440 are in the retracted positions. When the coupler 410 is inserted into the mount receiver 304 (e.g., the base 408 of the seat mount 200 engages the surface 412 of the mount bar 300), the user may lock the release handle 414 by pushing the release handle 414 inward relative to the coupler 410. In other examples, the release handle 414 automatically moves inward or retracts when the user releases the grip portion 418 of the release handle 414.

As the release handle 414 moves to the retracted position, the second plate 426 slides in the direction of the movement of the release handle 414, or toward the edge 804 of the slot 422 (e.g., such that the distance x between the edge 802 of the release handle 414 and the edge 804 of the slot 422 decreases as compared to the example of FIG. 8). The sliding of the second plate 426 as a result of the movement of the release handle 414 causes the pinion 432 of the actuator 430 to rotate due to the engagement of the pinion 432 with the rack 506 of the second plate 426. When the second plate 426 slides toward the edge 804 of the slot 422 due to the movement of the release handle 414, the pinion 432 rotates in a direction opposite the direction of rotation of the pinion 432 when the second plate 426 moves away from the edge 804 of the slot 422 and the release handle 414 moves the extended position. The rotation of the pinion 432 during movement of the release handle 414 to the retracted position causes the first and second locks 438, 440 to move outward relative to the actuator 430 via the engagement of the teeth 444 of the first and second locks 438, 440 with the pinion 432. The first and second locks 438, 440 extend into the respective notches 456 of, for example, the second mount receiver 304 to lock the seat mount 200 to the second mount receiver 304. In some examples, the respective springs 446, 448 of the first and second locks 438, 440 facilitate the extension of the locks 438, 440 by moving from compressed positions to extended positions.

In some such examples, after the user has released the release handle 414 (e.g., after pushing the handle inward) and the locks 438, 440 have moved into the notches 456 of the second mount receiver 304, the user moves the backrest arm(s) 203 away from the support portion 135 of the seat 128 to move the seat 128 from the folded position shown in FIG. 9 to the unfolded position shown in FIG. 2. In such examples, the first connector 500 of the seat connection hub 208 rotates such that the cam 468 re-engages or pushes on the second end 466 of the lock pin 460 and causes the first end 462 of the lock pin 460 to move into the pocket 464 of the release handle 414, thereby locking the release handle 414. In some examples, the user further moves the backrest arm(s) 203 to adjust a recline angle of the backrest portion 133 of the seat 128. In some examples, the user moves the napper bar 202 from the folded position to a desired height relative to the support portion 135 of the seat 128.

Thus, FIGS. 4-11 illustrate the removably secure coupling of the example seat mount 200 of FIGS. 2 and 9 to the example stroller frame 102 of FIGS. 1 and 3. As illustrated in FIGS. 3, 4, 10, and 11 the mount receiver(s) 302, 304, 306 are passive mechanical parts that do not include moving parts. Rather, the example seat 128 includes components that provide for locking of the seat mount 200 to one of the mount receivers 302, 304, 306. In particular, the example seat mount 200 includes at least two locking mechanisms including (1) the lock pin(s) 460 which prevents unintended movement of the release handle 414 and (2) the locks 438, 440 that removably secure the coupler 410 of the seat mount 200 to one of the mount receivers 302, 304, 306 via the rack-and-pinion of the actuator 430 and the second plate 426. Providing the locking mechanism(s) via the seat mount 200 reduces the number of components on the stroller frame 102 and, thus, reduces the potential for components on the stroller frame 102 and the seat 128 to fail or to improperly engage. Providing the locking mechanism(s) via the seat mount 200 also increases user control over the locking of the seat 128 to the stroller frame 102, as the operation of the seat mount 200 is controlled by the user via the backrest arm(s) 203, the napper bar 202, and the release handle 414. Because the mount receiver(s) 302, 304, 306 are mechanically passive components, once the user releases the release handle 414 after inserting the seat mount 200 into one of the mount receivers 302, 304, 306, the user can determine that the seat 128 is locked to the frame 102 via activation of the locks 438, 440 of the seat mount 200 without wondering if any components in the stroller frame 102 have properly reacted to the insertion of the seat mount 200. Further, the seats and/or accessories can be coupled to the mount receiver(s) 302, 304, 306 in different orientations (e.g., forward-facing or rearward-facing relative to the direction of travel of the stroller 100) without the user having to make any adjustments to the stroller frame.

Figure 12:
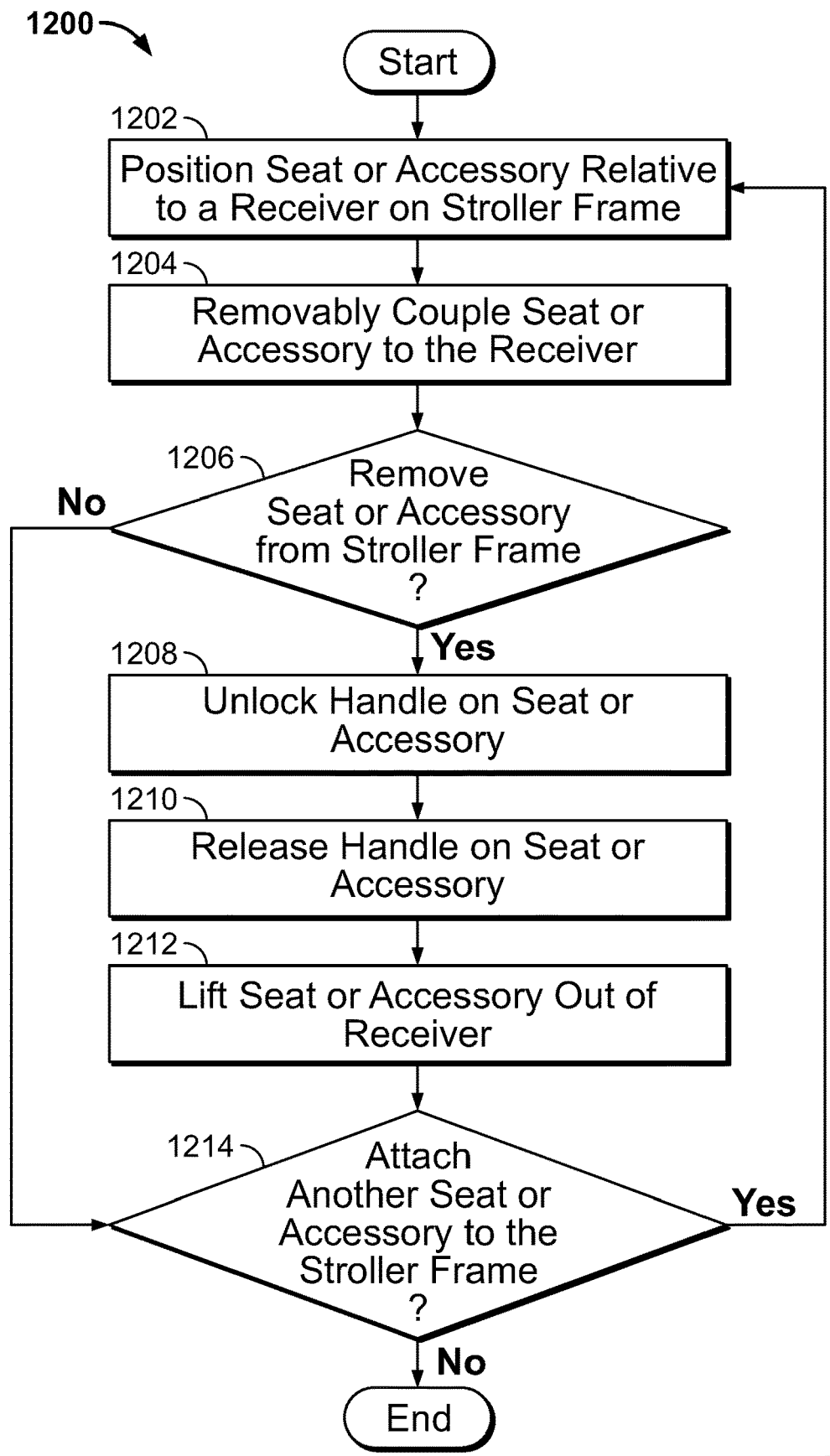
FIG. 12 is a flowchart representative of an example method disclosed herein for removably coupling a seat to a foldable stroller frame.

FIG. 12 is a flowchart illustrating an example process 1200 for removably coupling a seat or accessory (e.g., the seat 128, 130 or an accessory such as a basket) to a frame (e.g., the frame 102) of a stroller (e.g., the stroller 100). Although the example process 1200 is disclosed with respect to the flowchart illustrated in FIG. 12, many other methods of operating the example seat 128, 130 (or an accessory) and/or the example stroller frame 102 may alternatively be used. For example, the order of execution of the blocks may be changed, and/or some of the blocks described may be changed, eliminated, or combined.

The example process 1200 of FIG. 12 includes positioning the seat or accessory relative to a receiver on a stroller frame (block 1202). For example, a user can position the seat 128 over one of the mount receivers 302, 304, 306 of the frame 102 such that the seat mount 200 of the seat 128 is substantially aligned over an opening or cavity 310 of the one of the mount receivers 302, 304, 306.

The example process 1200 includes removably coupling the seat or the accessory to the receiver (block 1204). For example, the user can insert the seat mount 200 of the seat 128 in one of the mount receivers 302, 304, 306. When the seat mount 200 engages the one of the mount receivers 302, 304, 306, the locks 438, 440 of the coupler 410 of the seat mount 200 engage with the openings or notches 456 of the one of the mount receivers 302, 304, 306 to lock the seat 128 to the frame 102.

The example process 1200 includes a decision whether to remove the seat or accessory from the stroller frame (block 1206). For example, the user may decide to remove the seat or accessory from the frame because the stroller is no longer being used and the user wishes to fold stroller. Or the user may wish to replace the seat or accessory with a different type of seat or accessory. For example, the user may wish to replace an upright seat for a toddler with a bassinet to accommodate an infant.

If a decision is made not to remove a seat or accessory from the stroller frame (block 1206), the example process 1200 continues at block 1214, as disclosed below. However, if a decision is made to remove the seat or accessory from the stroller frame (block 1206), the example process 1200 includes unlocking a handle on the seat or accessory (block 1208). For example, the user may move the backrest arm(s) 203 of the seat 128 toward the napper bar 202 such that the backrest portion 133 of the seat 128 folds toward the support portion 135 of the seat 128. As the user moves the backrest arms 203 and, in some examples, the napper bar 202 to fold the seat 128, the cam(s) 468 of the seat connection hub(s) 208 of the seat 128 move away from the second end 466 of respective lock pin(s) 460, which releases the first end 462 of the spring-loaded lock pin(s) 460 from the pocket(s) 464 of the release handle 414. The release of the lock pin(s) 460 from the pocket(s) 464 of the release handle 414 via the rotation of the seat connection hub 208 enables a user to pull the release handle 414.

The example process 1200 includes releasing a handle on the seat or accessory to unlock the seat or accessory from the receiver (block 1210). For example, the user may pull the release handle 414 outward relative to the mount receiver 302, 304, 306 to which the seat mount 200 is coupled, which causes the second plate 426 to slide with the release handle 414 and rotate the actuator 430 of the seat mount 200. Rotation of the actuator 430 causes the locks 438, 440 to retract from the openings or notches 456 of the mount receiver 302, 304, 306.

When unlocked, the user can lift the seat or accessory out of the receiver (block 1212). For example, when the seat 128 or accessory is unlocked from the mount receiver 302, 304, 306 via the pulling of the release handle 414 and the resulting disengagement of the seat mount 200 from the mount receiver 302, 304, 306 via the retraction of the locks 438, 440, the seat or accessory can be lifted out of the mount receiver 302, 304, 306 by the user.

The example process 1200 includes a decision whether to attach another seat or accessory to the stroller frame (block 1214). For example, the user may wish to replace the seat (e.g., an upright seat) or accessory removed from the frame with another type of seat (e.g., a bassinet) or accessory. Also, if the user previously in the example process 1200 decided not to remove the seat or accessory from the stroller frame (e.g., block 1206), the decision at block 1214 would be whether to attach another seat or accessory to the frame via a different receiver than the receiver to which the seat or accessory is coupled. If the user wishes to attach another seat or accessory to the stroller frame (block 1214), the example process 1100 returns to the user positioning a seat or accessory over a receiver on the stroller frame to removably couple the seat or accessory to the frame (blocks 1202, 1204). The type of seat or accessory can differ from the seat or accessory currently attached to the stroller frame to provide for combinations such as one seat and one accessory, one upright seat and one bassinet, etc. Also, the orientation of the seat or accessory can differ from the seat or accessory currently attached to the stroller frame to include, for example, one forward-facing seat and one rearward-facing seat.

If the user does not wish to attach another seat or accessory to the stroller frame (block 1214), the example process 1200 ends.

From the foregoing, it will be appreciated that methods and apparatus have been disclosed to provide for removable coupling of one or more seats or accessories to a stroller frame. Disclosed example stroller frames provide for attachment of the one or more seats and/or accessories to the frame in different combinations with respect to type of seat (e.g., upright seat, bassinet), placement of the seat relative to the stroller frame (e.g., left, middle, or right side), and orientation (e.g., forward- or rearward-facing or sideways) without requiring the user to adjust the stroller frame or consider factors such as stability of the frame. Rather, the user attaches the one or more seats or accessories to the frame without modifying the frame and/or the seats or accessories, which provides for flexibility in coupling different seats and/or accessories to the stroller frame.

In disclosed examples, a seat mount of a seat or accessory is inserted into a receiver on the frame to couple the seat or accessory to the frame. In some disclosed examples, the seat mount includes locks that are engage with openings in the receiver to couple the seat mount to the receiver. In some such examples, the locks are operated via rotation of an actuator, which is activated by extension or retraction of a handle. In such examples, the rotation of the actuator causes the locks to extend and retract to mount the seat to the frame. The control of the locks via the handle of the seat mount increases user control over the coupling of the seat to the stroller frame and reduces the number of movable parts on the stroller frame, thereby simplifying the attachment of the seat and the frame while providing for secure coupling of the seat to the frame.

Further, in some disclosed examples, removal of the seat from the stroller via the slidable handle is controlled by a lock pin, which prevents unintended movement of the handle. Instead, a user selectively adjusts a positon of the backrest arm(s) and/or napper bar of the seat (e.g., to substantially fold the seat), which releases the lock pin disposed between a rotatable joint of the seat and the seat mount release handle. Thus, examples disclosed herein provide for secure coupling of a seat or accessory to the stroller to protect stroller occupants while also facilitating ease of access for the user (e.g., a caregiver).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A stroller comprising:
   a wheeled frame;
   a mount bar coupled to the frame, the mount bar including a plurality of receivers; and
   a seat including:
      a mount;
      a lock disposed in the mount; and
      an actuator;
      a spring disposed between the actuator and the lock; and
      a handle to move between an extended position and a retracted position to removably couple the mount to one of the plurality of receivers via the lock.

2. The stroller of claim 1, wherein respective ones of the plurality of receivers include a substantially frustoconical portion and the mount includes a substantially frustoconical portion.

3. The stroller of claim 1, wherein the actuator is to rotate when the handle moves from the retracted position to the extended position, the lock to move relative to one of the plurality of receivers in response to the rotation of the actuator.

4. The stroller of claim 1, wherein respective ones of the receivers include an opening, the handle to cause the lock to move relative to the opening of one of the plurality of receivers to removably couple the mount to the one of the plurality of receivers.

5. The stroller of claim 4, wherein the spring is to move from an expanded position to a compressed position when the handle moves from the retracted position to the extended position.

6. The stroller of claim 5, wherein the lock is to be disposed external to the opening when the spring is in the retracted position and wherein at least portion of the lock is to be disposed in the opening when the spring is in the compressed position.

7. A stroller comprising:
   a wheeled frame;
   a receiver coupled to the frame; and
   a seat including:
      a mount;
      a lock disposed in the mount;
      an actuator, at least a portion of the actuator to selectively engage the lock;
      a handle movable between a retracted position and an extended position, the actuator to rotate to cause the lock to move relative to the receiver when the handle moves from the retracted position to the extended position; and
      a plate slidably coupled to the handle, the actuator to rotate via sliding of the plate.

8. The stroller of claim 7, wherein the plate is disposed in a housing defined in a portion of the handle.

9. The stroller of claim 8, wherein the plate includes an opening, the opening including teeth, at least a portion of the actuator to engage the teeth.

10. The stroller of claim 8, wherein the plate is a first plate and the mount further includes a second plate, the first plate disposed between the handle and the second plate.

11. The stroller of claim 10, wherein the second plate and the handle are coupled to the mount via a fastener, the fastener extending through an opening in the first plate, the first plate to slide relative to the fastener when the handle moves to the extended position.

12. The stroller of claim 7, wherein the lock is to move between a first position in which the lock is disposed in an opening of the receiver and a second position in which the lock is retracted relative to the opening.

13. The stroller of claim 7, wherein the receiver is a first receiver and further including a second receiver coupled to the frame, the seat removably couplable to the first receiver or the second receiver.

14. The stroller of claim 7, wherein the lock is a first lock and further including a second lock disposed in the mount opposite the first lock, at least a portion of the actuator to engage the second lock.

15. The stroller of claim 14, wherein the second lock is to move relative to the receiver in response to the rotation of the actuator.

16. A seat to be coupled to a frame of a stroller, the seat comprising:
a base; and
a mount coupled to the base, the mount including:
a handle moveable between a retracted position and an extended position;
a lock; and
an actuator to rotate to cause the lock to move from a first position to a second position when the handle moves from the retracted position to the extended position to removably couple the seat to the frame, the actuator to rotate about an axis extending perpendicular to an axis along which the handle moves.

17. The seat of claim 16, wherein the handle is disposed proximate to a backrest of the seat.

18. The seat of claim 16, further including a spring to bias the lock in the first position, the spring to retract based on in response to the rotation of the actuator.

19. A seat to be coupled to a frame of a stroller, the seat comprising:
a base; and
a mount coupled to the base, the mount including:
a handle moveable between a retracted position and an extended position;
a lock; and
an actuator to rotate to cause the lock to move from a first position to a second position when the handle moves from the retracted position to the extended position to removably couple the seat to the frame, the actuator including a pinion, a portion of the pinion to selectively engage the lock during rotation of the actuator.

* * * * *

UNITED STATES PATENT AND TRADEMARK OFFICE
CERTIFICATE OF CORRECTION

PATENT NO. : 11,059,510 B2
APPLICATION NO. : 16/320914
DATED : July 13, 2021
INVENTOR(S) : Mark Eyman et al.

Page 1 of 1

It is certified that error appears in the above-identified patent and that said Letters Patent is hereby corrected as shown below:

In the Claims

Column 18, Line 12 (Claim 1):
Delete "and".
Column 20, Line 8 (Claim 18):
Delete "based on".

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*